(12) United States Patent
Grechishkin et al.

(10) Patent No.: US 8,117,554 B1
(45) Date of Patent: Feb. 14, 2012

(54) SEAMLESS INTEGRATION OF NON-NATIVE WIDGETS AND WINDOWS WITH DYNAMICALLY SCALABLE RESOLUTION INTO NATIVE OPERATING SYSTEM

(75) Inventors: Alexander A. Grechishkin, Moscow (RU); Maxim A. Kuzkin, Moscow (RU); Alexey B. Koryakin, Moscow (RU); Sergei Malykhin, Moscow (RU); Andrey A. Omelyanchuk, Moscow (RU); Alexander G. Tormasov, Moscow (RU)

(73) Assignee: Parallels Holdings, Ltd. (BM)

( * ) Notice: Subject to any disclaimer, the term of this patent is extended or adjusted under 35 U.S.C. 154(b) by 403 days.

(21) Appl. No.: 12/404,312

(22) Filed: Mar. 15, 2009

Related U.S. Application Data

(63) Continuation-in-part of application No. 11/739,131, filed on Apr. 24, 2007, now Pat. No. 7,987,432.

(60) Provisional application No. 61/037,237, filed on Mar. 17, 2008, provisional application No. 60/745,532, filed on Apr. 25, 2006, provisional application No. 60/823,988, filed on Aug. 30, 2006.

(51) Int. Cl.
*G06F 3/00* (2006.01)

(52) U.S. Cl. ........... 715/764; 715/846; 715/847; 703/23

(58) Field of Classification Search ........ 711/6; 703/23; 345/521; 715/764, 846–847; 717/109; 718/1; 719/328
See application file for complete search history.

(56) References Cited

U.S. PATENT DOCUMENTS

| | | |
|---|---|---|
| 6,397,242 B1 | 5/2002 | Devine et al. |
| 6,496,847 B1 | 12/2002 | Bugnion et al. |
| 6,704,925 B1 | 3/2004 | Bugnion |
| 6,711,672 B1 | 3/2004 | Agesen |
| 6,725,289 B1 | 4/2004 | Waldspurger et al. |
| 6,735,601 B1 | 5/2004 | Subrahmanyam |
| 6,785,886 B1 | 8/2004 | Lim et al. |
| 6,789,156 B1 | 9/2004 | Waldspurger |
| 6,795,966 B1 | 9/2004 | Lim et al. |
| 6,880,022 B1 | 4/2005 | Waldspurger et al. |
| 6,944,699 B1 | 9/2005 | Bugnion et al. |
| 6,961,806 B1 | 11/2005 | Agesen et al. |
| 7,069,413 B1 | 6/2006 | Agesen et al. |
| 7,082,598 B1 | 7/2006 | Le et al. |
| 7,089,377 B1 | 8/2006 | Chen |
| 7,111,086 B1 | 9/2006 | Ecoleston et al. |
| 7,111,145 B1 | 9/2006 | Chen et al. |
| 7,149,843 B1 | 12/2006 | Agesen et al. |
| 7,155,558 B1 | 12/2006 | Vaghani et al. |
| 7,222,221 B1 | 5/2007 | Agesen et al. |
| 7,260,815 B1 | 8/2007 | Chen et al. |
| 2002/0013892 A1* | 1/2002 | Gorishek et al. .............. 712/227 |

(Continued)

*Primary Examiner* — Michael Roswell
(74) *Attorney, Agent, or Firm* — Bardmesser Law Group

(57) ABSTRACT

A method, system and computer program product recorded on a computer-readable medium for execution on at least one processor, for seamless integration of a non-native application into a host OS, including launching a first Virtual Execution Environment (VEE) on a computing system that has a host operating system and a host desktop displayed to a user; displaying a window corresponding to the VEE on the host desktop; upon a user invoking a user application that is non-native to both the host OS and the first VEE, (a) installing a second VEE that is compatible with the user application, (b) installing the user application into the second VEE, (c) launching the application inside the second VEE, and (d) displaying the non-native application window within a window of the second VEE. The VEE can be a Virtual Private Server or a Virtual Machine.

19 Claims, 33 Drawing Sheets

U.S. PATENT DOCUMENTS

| | | |
|---|---|---|
| 2005/0091310 A1* | 4/2005 | Salomon ........................ 709/203 |
| 2006/0010433 A1 | 1/2006 | Neil |
| 2006/0227141 A1* | 10/2006 | Hogle ........................... 345/473 |
| 2006/0230156 A1* | 10/2006 | Shappir et al. ................ 709/227 |
| 2006/0277481 A1* | 12/2006 | Forstall et al. ................ 715/764 |
| 2007/0043860 A1 | 2/2007 | Pabari |
| 2007/0067769 A1* | 3/2007 | Geisinger ........................ 718/1 |
| 2007/0101323 A1 | 5/2007 | Foley |

* cited by examiner

SEAMLESS INTEGRATION OF NON-NATIVE WIDGETS AND WINDOWS WITH DYNAMICALLY SCALABLE RESOLUTION INTO NATIVE OPERATING SYSTEM

CROSS-REFERENCE TO RELATED APPLICATIONS

This application is a continuation in part of U.S. patent application Ser. No. 11/739,131, filed on Apr. 24, 2007 now U.S. Pat. No. 7,987,432, entitled SEAMLESS INTEGRATION AND INSTALLATION OF NON-NATIVE APPLICATION INTO NATIVE OPERATING SYSTEM, which is a non-provisional of U.S. Provisional Patent Application No. 60/823,988; Filed: Aug. 30, 2006, entitled SEAMLESS INTEGRATION AND INSTALLATION OF NON-NATIVE APPLICATION INTO NATIVE OPERATING SYSTEM, and U.S. Provisional Patent Application No. 60/745,532; Filed: Apr. 25, 2006, entitled SEAMLESS INTEGRATION OF NON-NATIVE APPLICATION INTO NATIVE OPERATING SYSTEM, which are all incorporated by reference herein in their entirety.

This application is a non-provisional of U.S. Provisional Patent Application No. 61/037,237; Filed: Mar. 17, 2008, entitled SEAMLESS INTEGRATION AND INSTALLATION OF NON-NATIVE APPLICATION AND WIDGETS INTO NATIVE OPERATING SYSTEM, which is incorporated by reference herein in its entirety.

BACKGROUND OF THE INVENTION

1. Field of the Invention

This invention relates to a method, system and computer program product for integrating application software and widgets/gadgets (and similar objects) written for one operating system into other operating system environments.

2. Description of the Related Art

One of the features that today many computer users desire to have is interoperability between applications written for different operating systems. For example, the APPLE Macintosh computer and its graphical user interface, browser and operating system have a loyal following in the marketplace. At the same time, APPLE Computer, Inc.'s market share is approximately 3-5% of the overall desktop and laptop computer market. As a result, the number of software titles that are written for the MICROSOFT WINDOWS platform (which is approximately 90% of the market today) is vastly greater than the number of software titles written for the APPLE Macintosh. Nonetheless, many APPLE Macintosh users would like to be able to run WINDOWS applications on their Macintosh's, and to do it as "seamlessly" as possible.

Also, many users, regardless of their choice of operating system, also would like to view elements of dynamic web pages presenting data that constantly changes on their desktops without having to download a particular page or an entire web application.

Accordingly, there is a need in the art for a system and method for seamless integration of non-native operating system applications, widgets, gadgets and similar entities into native operating system environments.

SUMMARY OF THE INVENTION

Accordingly, the present invention is related to a system, method and computer program product for seamless integration of non-native applications and widgets into a host OS that substantially obviates one or more of the disadvantages of the related art.

In one aspect, there is provided a method, system and computer program product recorded on a computer-readable medium for execution on at least one processor, for seamless integration of a non-native application into a host OS, including launching a first Virtual Execution Environment (VEE) on a computing system that has a host operating system and a host desktop; displaying a window corresponding to the first VEE on the host desktop; installing a second VEE that is compatible with a user application; installing the user application into the second VEE; upon a user invoking the user application, launching the user application inside the second VEE; and displaying at least part of a window of the user application within a desktop window of the second VEE.

As various options, the window of the user application window is fully displayed, or only partially displayed. The second VEE is any of a Virtual Private Server, a Virtual Machine, a Hypervisor-based Virtual Machine, a Lightweight Hypervisor-based Virtual Machine, a VMM-based Virtual Machine, a Hypervisor-based VM with hardware virtualization support, a Hypervisor-based VM without hardware virtualization support, a Hypervisor-based VM with security support, a Hypervisor-based VM without security support, a VIRTUOZZO-type Virtual Private Server, a SUN MICROSYSTEMS container-based environment, an HPUX internal container environments, and a jail-based environments. The first VEE is any of a session of Terminal Server Windows 2003 (or older) and a session of CITRIX Presentation Server.

The second VEE is installed and launched on the same computer as the first VEE, or the second VEE is installed and launched on a remote machine and its output is shown on a client computer, or the second VEE is installed and launched on a remote computer cluster. The second VEE window is partially invisible, except for a window showing the user application, or the second VEE window is made invisible automatically upon startup of the non-native application, except for a window showing the user application. The file system of the second VEE is seamlessly integrated into the file system of the host operating system and the first VEE. The user can drag-and-drop objects from within the first VEE window to the user application. The user can drag-and-drop objects from within the user application to the first VEE window. The user invokes the user application by using autorun media, where autorun media contains the user application and/or where the autorun media contains a snapshot of the second VEE. The user application can also be invoked by using autoplay media.

As yet further options, the VEE desktop can be unhidden in response to the user's request and the window of the user application placed inside the window corresponding to the VEE. An icon of the window corresponding to the first VEE is placed on the host desktop. The host desktop is Windows desktop and the icon is placed on the taskbar. Stubs to user application are placed in the host OS with for handling stubs using icons through host OS. The host desktop is a Mac OS desktop and the icon is placed on the Mac OS Dock Bar. A full screen toggling images of the host desktop and the second VEE desktop can be done in response to a user request. The window corresponding to the VEE stays visible after toggling. The toggling is performed using 3D animation of the desktops images. The user application installation includes driver installation and/or configuration of the user application. The host OS and the first VEE support transparent copy/paste operations between the host desktop and the first VEE desktop, and transparent copy/paste operations between the host applications and the user application. The user application can operate with a file system of the host OS as if the file system of the host OS were part of the first VEE's file system. Security rules related to data transmission between the host OS and the VEE and access rules from host OS to VEE and/or from VEE to host OS are implemented. Sets of security rules and/or access rules corresponding to different levels of security can be implemented, with the sets of security rules being changed using configuration application representing slider image on the host desktop or on the window related to VEE. The first VEE and the host OS share at least some file system folders. Groups of objects can include, for example, part of the file system of the host OS, part of the file system of the first VEE desktop, My Documents for MICROSOFT WINDOWS, My Pictures for MICROSOFT WINDOWS, My Videos for MICROSOFT WINDOWS, User Home Directory for both MICROSOFT WINDOWS and Mac OS, Program Files for MICROSOFT WINDOWS, Applications for Mac OS, Movies for Mac OS, and Pictures for Mac OS.

The second VEE's desktop can be hidden so that the user application occupies the entire window corresponding to the second VEE, or hidden partially, and at least some second VEE graphical user interface (GUI) elements are visible. The elements include, for example, a "Start" Menu for MICROSOFT WINDOWS and Mac OS Dock Bar.

As yet a further option, a Virtual Machine (VM) can be running as the second VEE; a window/application in the first VEE is associated with the VM; a visual element represented corresponding window/application associated with the VM in a graphical user interface of the first VEE; and a pop up (context) menu associated with the visual element. Some GUI elements hidden in the second VEE are shown in the pop up menu. The graphical user interface comprises any of window/application list in MICROSOFT WINDOWS Task Bar, and an application list in Mac OS Dock Bar.

The first VEE has links to at least one user application of the second VEE. Dragging documents to the user application links leads to starting corresponding user application. Multiple user applications can be launched in the second VEE. The first VEE has a utility association in a context menu. The context menu is, for example, "Send to mail recipient" in MICROSOFT WINDOWS, "Send to compressed folder" in MICROSOFT WINDOWS and "Create archive" in Mac OS. Thus, the user can have "Send to mail recepient" context menu item (in the first VEE). The association is changed to the linked user application from the second VEE. In the case of the first VEE being a Mac OS, and the second VEE being MICROSOFT WINDOWS, the user will mail documents through the context menu via OUTLOOK in WINDOWS. A reverse scenario is also possible: mailing a document in the second VEE and as a result it will actually be mailed through the APPLE Mail.

As yet a further option, files are associated with the user application by using a link and based on file type. The user application can be invoked using the user request to open the file having the appropriate file type. The file type is associated with a host utility, which is started when the user requests to open the file having the file type. The host utility launches the user application and delivers data and settings to the user application that are required for handling the file by the user application. As a further option, a single host utility is associated with more than one file type, and the host utility detects the user application required for handling of the file, launches the user application and delivers the data and the settings to the user application. An icon corresponding to the user application is placed on the host desktop. The user chooses the icon, a host utility is started that launches the user application. Multiple icons corresponding to different non-native user applications are placed on the host desktop and wherein the host utility is started when user chooses any of the icons. The host utility launches any of the user applications corresponding to the selected icon.

In another aspect, a method for integration of a non-native document into a host OS, includes launching a first Virtual Execution Environment (VEE) on a computing system that has a host operating system and a host desktop; displaying a window corresponding to the first VEE on the host desktop; installing an application into the first VEE that is compatible with the document; installing a second VEE that is incompatible with the document but contains the document; associating the document with the first VEE; upon a user invoking the document, launching the application inside the first VEE, and opening the document that is located in the second VEE by using the application.

The second VEE is installed and launched on the same computer as the first VEE, or on a remote machine, or on a remote computer cluster. The second VEE window is partially or entirely invisible, except for a window showing the user application, and/or second VEE window is made invisible automatically upon startup of the non-native application, except for a window showing the user application. The file system of the second VEE is seamlessly integrated into the file system of the host operating system and the first VEE. The user can drag-and-drop objects from within the first VEE window to the user application, or the user can drag-and-drop objects from within the user application to the first VEE window.

In another aspect, there is provided a method, system and computer program product for seamless integration of a non-native application into a user's operating system (OS), including launching a first Virtual Execution Environment (VEE) on a computing system that has the user's OS and the user's OS desktop being displayed to a user; displaying a window corresponding to the VEE and a guest OS of the VEE on the user's OS desktop; upon a user invoking an application that is non-native to the user's OS, (a) installing the application into the first VEE, (b) launching the application inside the first VEE, and (c) making the window invisible, except for a portion of the window occupied by the application. The user's OS desktop can be provided with an icon for starting the application in the first VEE. The icon corresponds to a file whose extension is associated with the application, or a direct link to the application, or a hardware device supported by the application. The file system of the second VEE can be seamlessly integrated into the file system of the user's operating system. The portion of the window occupied by the application can have a complex or an irregular shape.

In another aspect, there is provided a system for seamless integration of a non-native applications into a host OS, including a plurality of Virtual Machines running on a computing system that has a host operating system and a host desktop displayed to a user. Each Virtual Machine has a guest operating system running within it, and each Virtual Machine has a corresponding window on the host desktop, the window displaying a desktop of the guest operating system. Each Virtual Machine is running a user application that is non-native to both the host OS and other Virtual Machines. The user applications can exchange objects with applications in other Virtual Machines and in the host OS through drag-and-drop commands by the user.

In another aspect, there is provided a system for seamless integration of a non-native applications into a host OS, including a plurality of Virtual Machines running on a computing system that has the host OS and has a host desktop displayed to a user. Each Virtual Machine has a guest operating system running within it. Each Virtual Machine running a user application that is non-native to both the host OS and other Virtual Machines. Each user application has a window displayed on the host desktop that is integrated into the host desktop to use a graphical interface of the host desktop.

Another exemplary embodiment of the present invention includes a Virtual Execution Environment, such as a Virtual Machine (VM), running on a computer system. A widget application is running on the VM. For exemplary purposes, the computer system at issue is a computer, running Mac OS, with the conventional APPLE appearance of the desktop, dock bar at the bottom of the screen, and the other desktop features. A user of the computer system would like to use a particular feature (i.e., widget) of MS WINDOWS, for example a calculator.

According to another exemplary embodiment, the MS WINDOWS application (such as, for example, a calculator) is virtualized on another host OS, such as, for example, the Mac OS. A Virtual Machine (VM) running MICROSOFT WINDOWS as a guest operating system (OS) is launched on APPLE computer and a MICROSOFT WINDOWS calculator widget appears on user's Mac desktop screen. This icon can be also added to a Mac desktop system tray equivalent (i.e., tool bar) instead. Then a user can click on the calculator icon on the Mac dock bar and MICROSOFT WINDOWS calculator widget will appear on the Mac desktop screen. The user can use the calculator as if he were using MICROSOFT WINDOWS on his computer.

In another embodiment, a widget can be a part of the web application template that is downloaded to the VM implemented on the user computer system. For example, a widget of a clock displaying the time in a particular part of the world can be placed on the user's desktop screen and the user can see the clock without having to log onto the web site where the clock template is implemented.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

Figure 32:
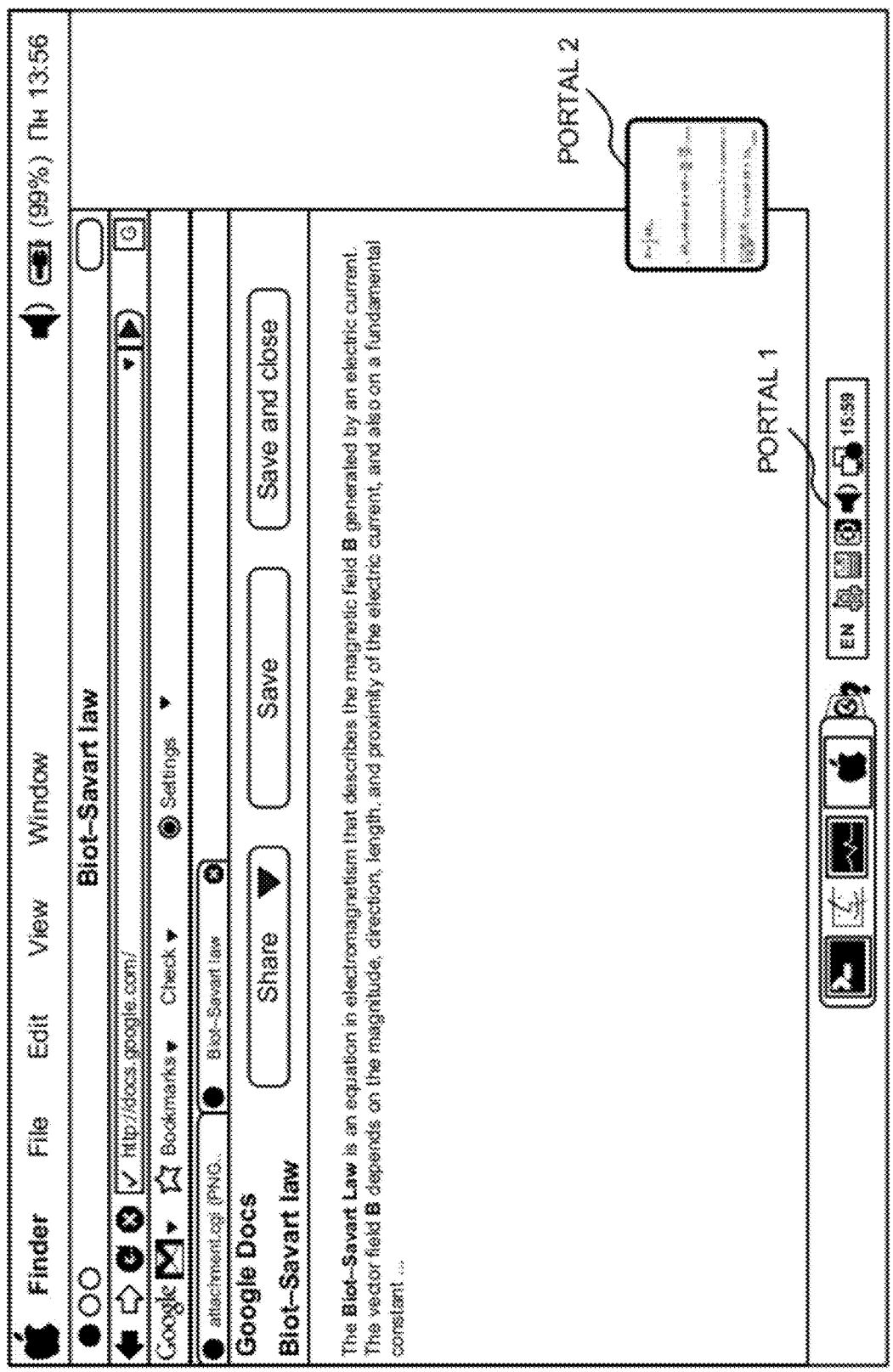

FIG. 32 is another example of two portals, portal 1, which is at 100% scale and portal 2, which is at roughly 50% scale.

Figure 33:
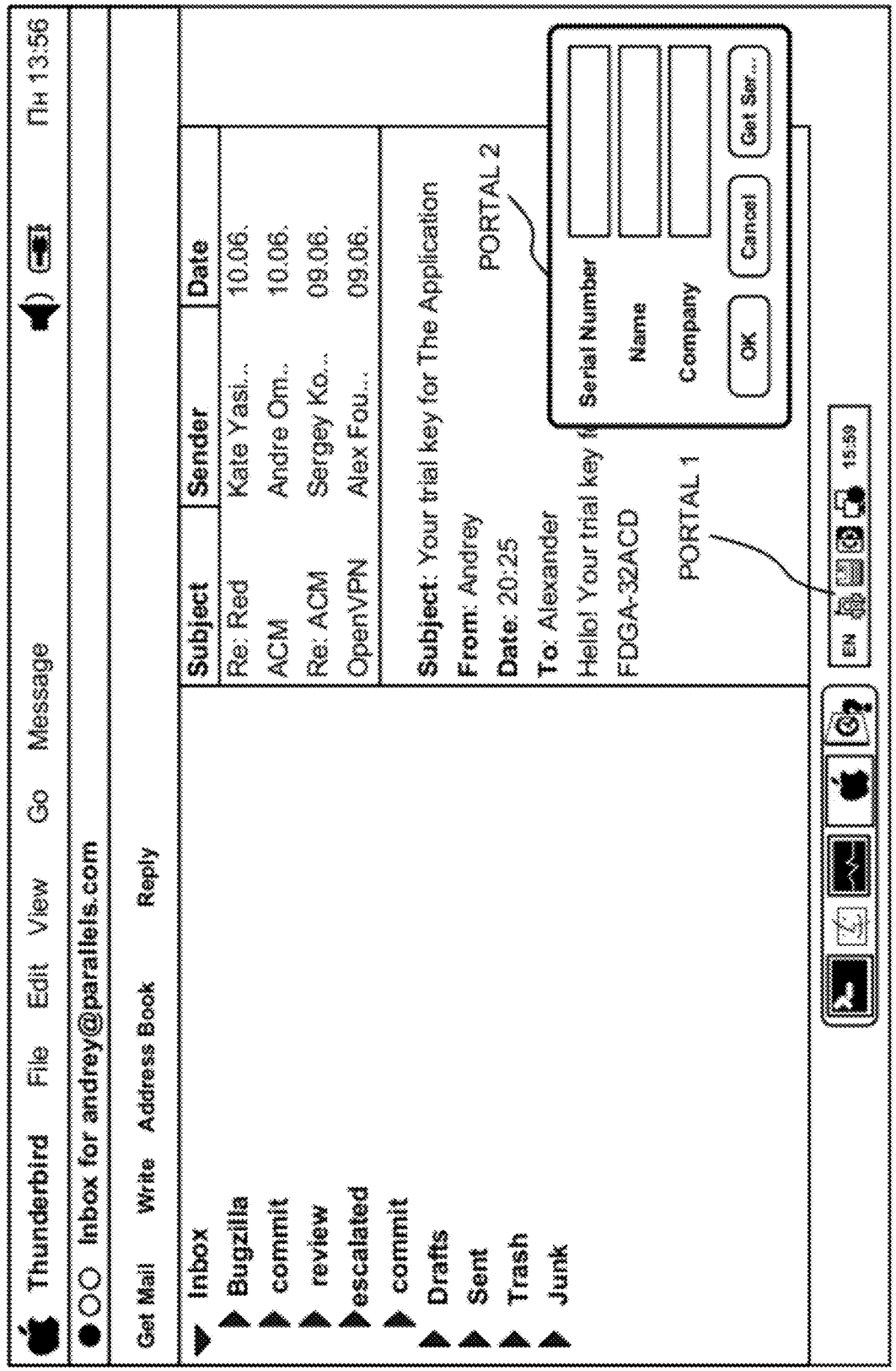

FIG. 33 is another illustration of two portals.

DETAILED DESCRIPTION OF THE PREFERRED EMBODIMENTS

Reference will now be made in detail to the preferred embodiments of the present invention, examples of which are illustrated in the accompanying drawings.

The following definitions are generally used throughout this description:

VEE—Virtual Execution Environment—a type of environment that supports program code execution, where at least a part of the hardware and software required for running program code are presented as their virtual analogs. Virtual analogs, such as virtual storage, refers to storage that is virtualized as part of real storage (HDD, partition, file or Flash drive, etc.), "virtual memory" refers to memory that is virtualized as part of real physical memory, swappable memory mapped file, etc. VEE generally implies a coexistence of a host operating system and a "foreign" execution environment in the host operating system simultaneously. From the point of view or the user, the code in the VEE runs as if it were running on the real computing system.

VM—a type of an isolated Virtual Execution Environments running on the same physical machine simultaneously. Each Virtual Machine instance executes its own OS kernel. Support of Virtual Machines is implemented using a Virtual Machine Monitor and/or a Hypervisor.

Hypervisor—control software having the highest privilege level for administrating hardware computer resources and Virtual Machines, see discussion in U.S. patent application Ser. No. 11/348,382; Filed: Feb. 7, 2006, entitled SYSTEM AND METHOD FOR STARTING VIRTUAL MACHINE MONITOR IN COMMON WITH ALREADY INSTALLED OPERATING SYSTEM, incorporated herein by reference in its entirety.

Virtual storage—block-level storage space that may be regarded by the user of a computer system as addressable hardware storage, or a storage partition, using virtual addresses, that are utilized during virtual disk input/output operations as physical addresses.

Disk image—a file or a consistent set of files that represents content of a disk storage or of a partition corresponding to virtual storage on a block level.

Virtual disk driver—an OS driver that enables other programs to interact with a virtual hardware device. The virtual disk driver may be implemented as a special driver or may be implemented by adding, to the standard hardware driver, additional functionality, for example, filtering or redirecting ability. The disk image and virtual disk driver may be used by the VEEs of the present invention as one possible implementation.

Figure 9:
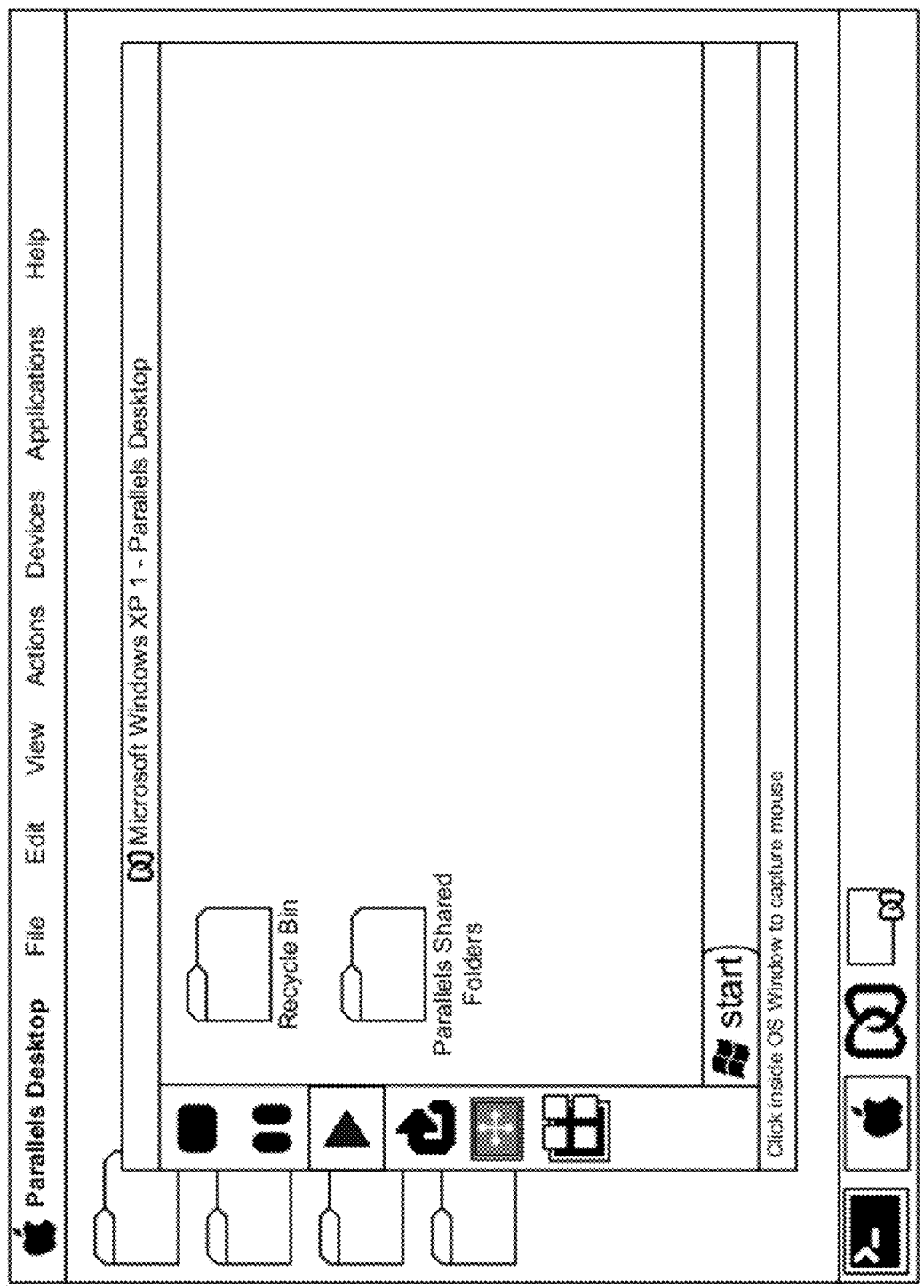
FIGS. 9-18 illustrate screenshots of how Virtual Machines and non-native applications can be integrated into the Mac OS.
Figure 17:
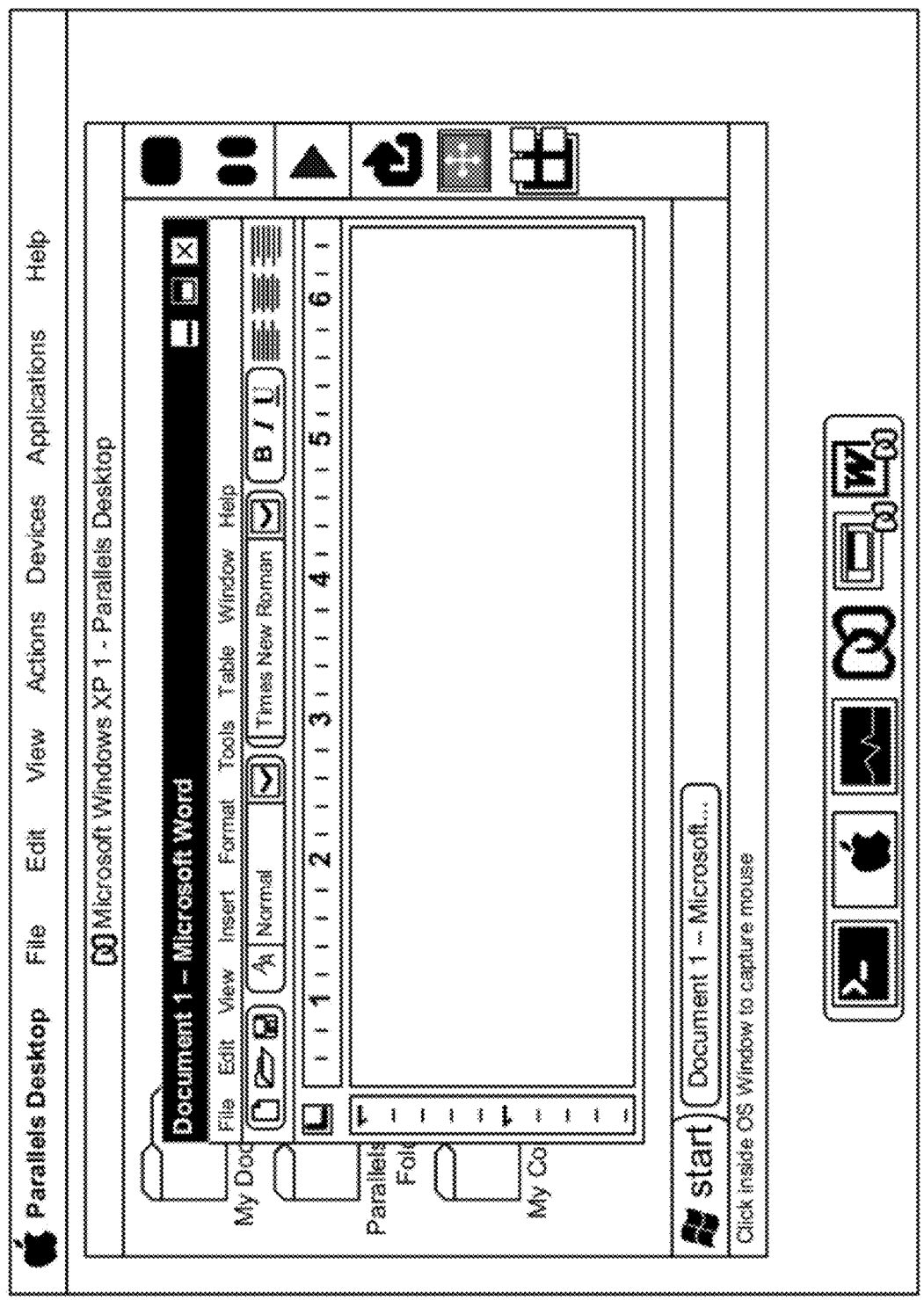
Figure 18:
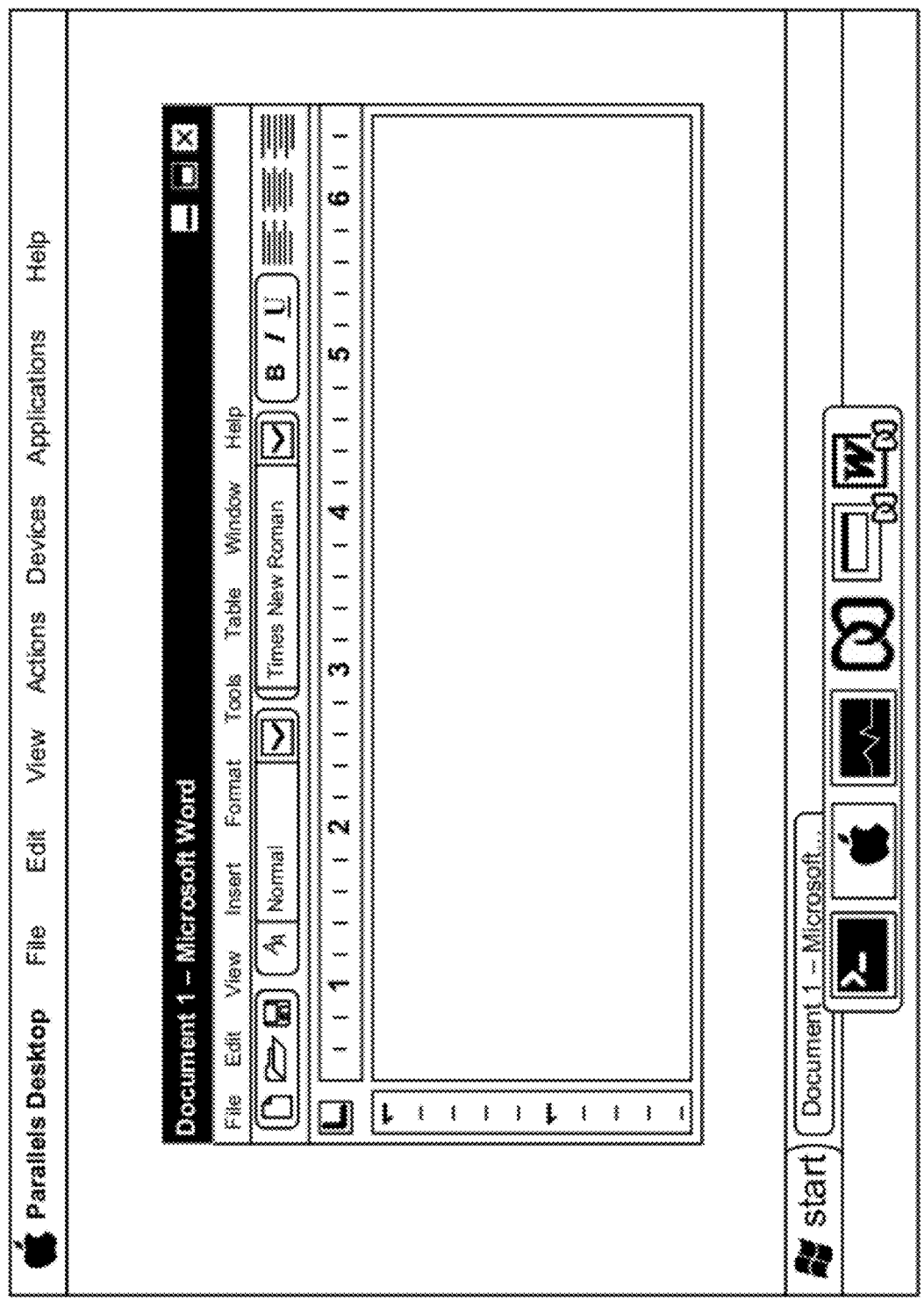

One embodiment of the present invention involves the launching of a Virtual Execution Environment, such as a Virtual Machine, within which another user application is running. For purposes of illustration, the computer at issue is an APPLE Macintosh computer, running APPLE's Mac OS operating system, with the usual APPLE Computer/Mac OS "look and feel," desktop, dashboard at the bottom of the screen, etc. A user would like to launch a WINDOWS application, for example, MICROSOFT WORD FOR WINDOWS. To do so, a Virtual Machine is launched, such that a window appears on the desktop screen. Within that window is the WINDOWS desktop, for example, showing the usual WINDOWS icons, the Start button, the toolbar, menu bar, system tray, etc. That WINDOWS desktop is therefore part of a guest operating system, while APPLE's OS/X or Mac OS (for example) is the host operating system (in this example), see schematic in FIG. 1 and screenshot in FIG. 9. Then the user can launch Microsoft Word inside the guest operating system and the user will see MICROSOFT WORD FOR WINDOWS window on/over the guest OS desktop, see screenshots in FIGS. 17-18.

Some examples of the user applications are: system administrator shells, system spreadsheets, web browsers, games, text editors, network tools, desk managers, databases, graphics/image browsers and editors, file managers, word processors, mail programs, multimedia tools, language tools, daemons, servers, including system services, daemons, and similar constructs typically utilized by the user's database software, webpage servers, remote procedure calls, support daemons, Telnet servers, backup utilities, development tools, device drivers, printer utilities, emulators, firewalls, antivirus software, anti-spam software, anti-adware software, intrusion detection systems, various other forms of security-related and anti-malware software, and so on.

Figure 1:
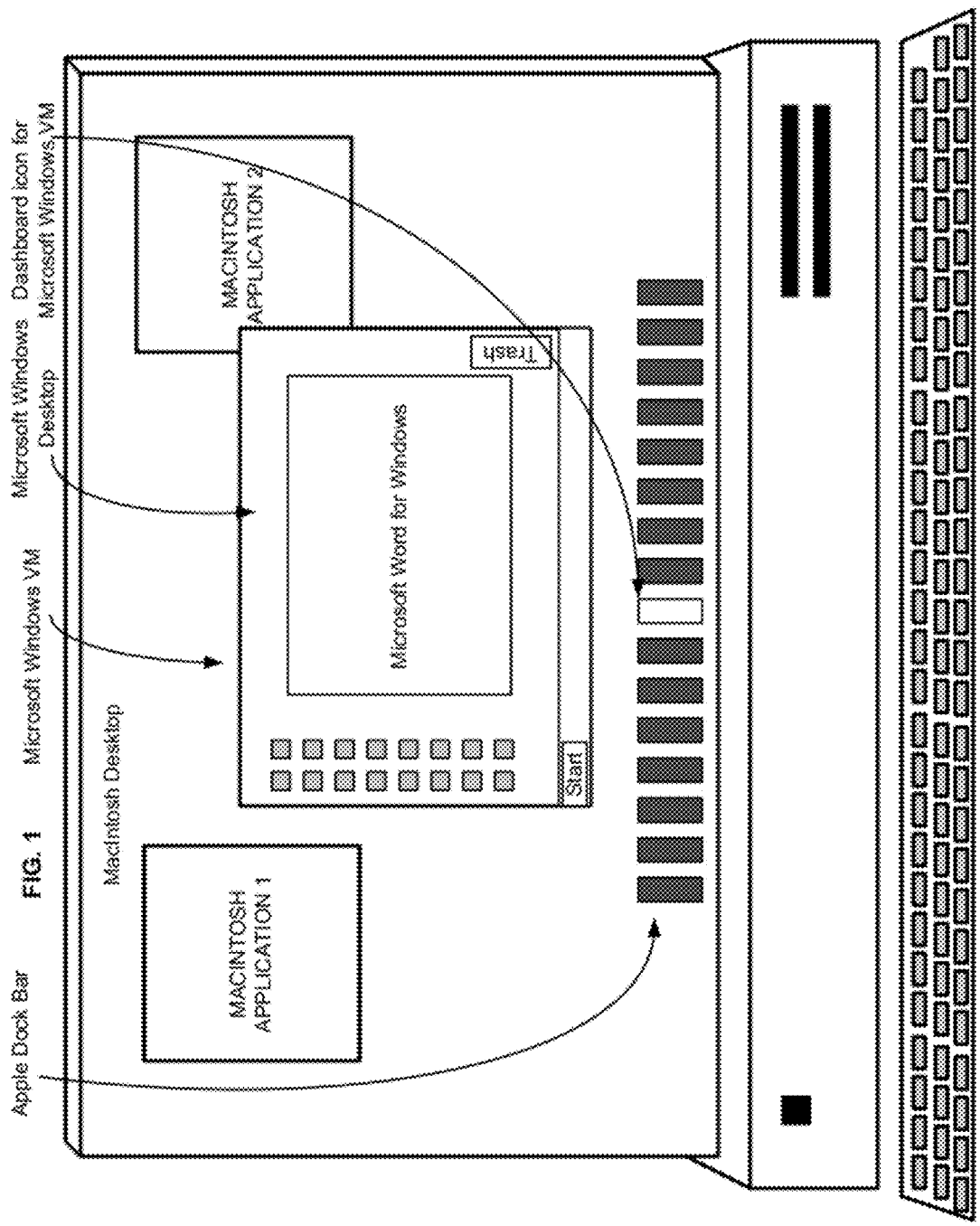
FIGS. 1-7 illustrate various exemplary embodiments of the invention in the context of the APPLE Macintosh desktop.

With the WINDOWS operating system as the guest OS now running inside the Virtual Machine, and the desktop and other facilities and utilities of WINDOWS now available within that window as a separate window in the Macintosh desktop, a user can launch the WINDOWS application that he desires, in this example, MICROSOFT WORD FOR WINDOWS, see FIG. 1. The MICROSOFT WORD FOR WINDOWS application will open a window inside the MICROSOFT WINDOWS desktop (in other words, a window within a window). As would be familiar to users of MICROSOFT WINDOWS, the Microsoft Word window can occupy either the entire screen, with only the task bar at the bottom visible, or can be a smaller window within the desktop window.

Figure 2:
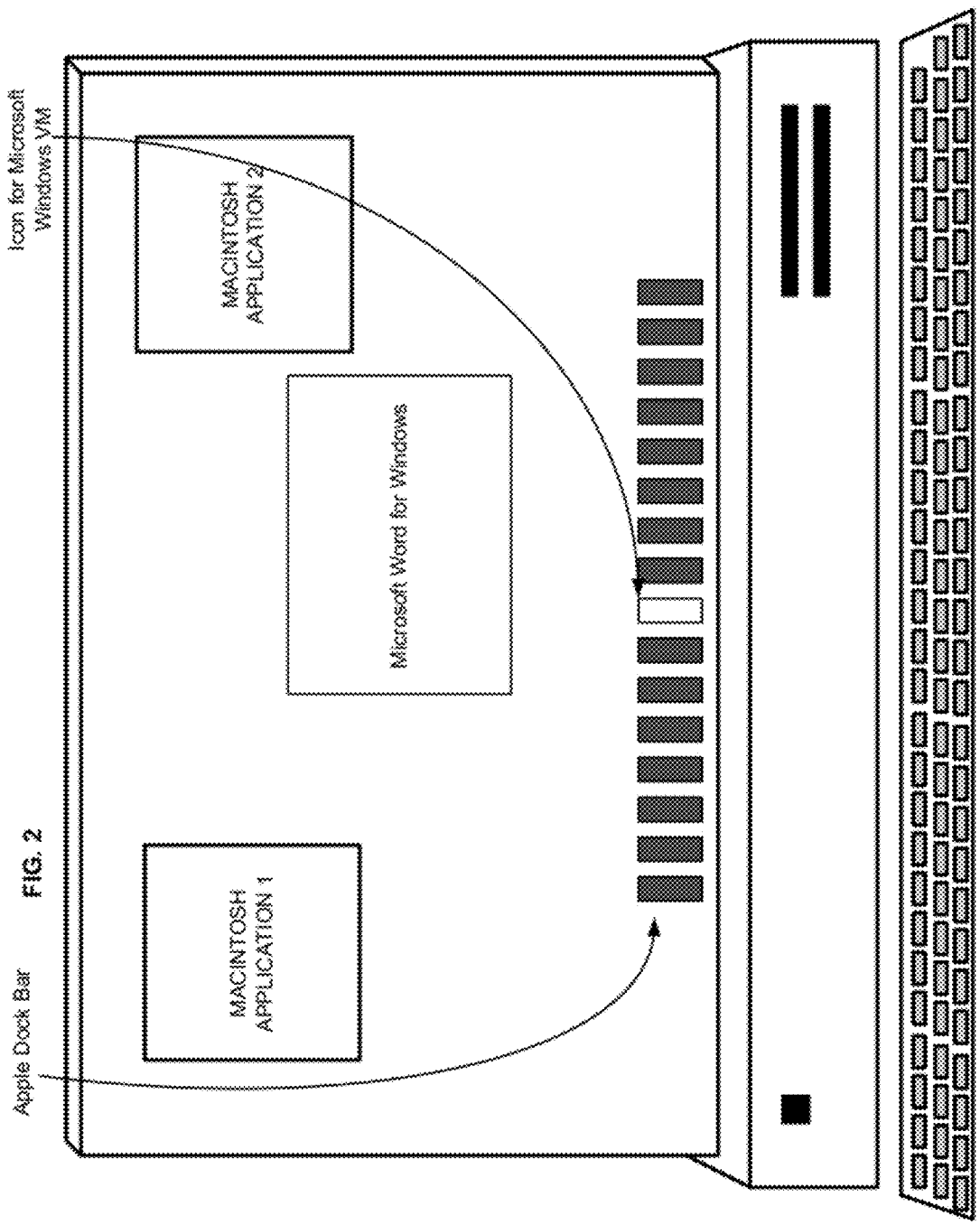
Figure 11:
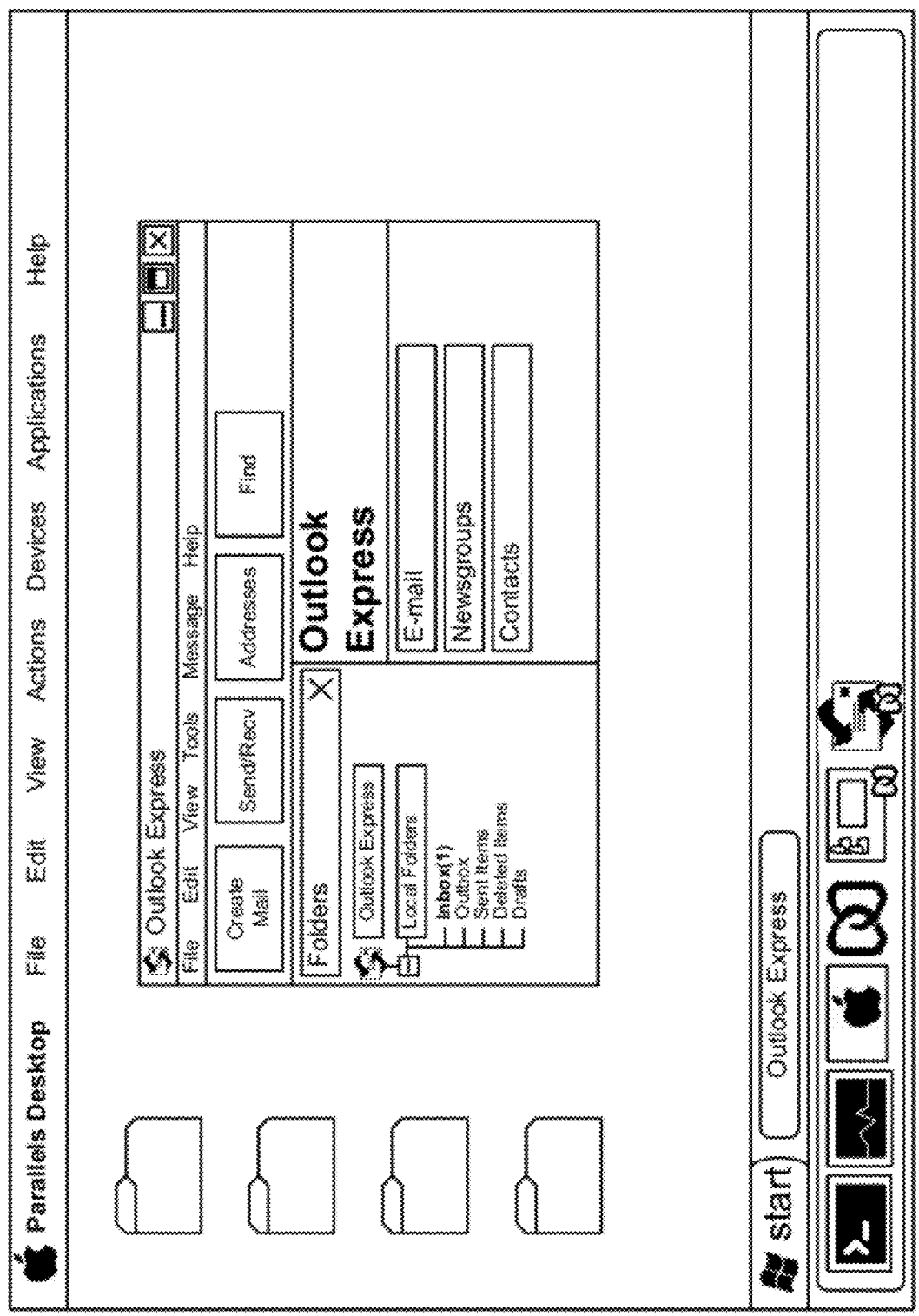

Additionally, it is possible to make the integration of the MICROSOFT WORD FOR WINDOWS into APPLE Macintosh more seamless by making everything other than the MICROSOFT WORD FOR WINDOWS window (of the VM) invisible—regardless of the size of the Microsoft Word window. This can be done, for example, by manipulating the properties of the MICROSOFT WINDOWS desktop window, over which the Virtual Machine and the guest operating system have control. Thus, with everything other than the MICROSOFT WORD FOR WINDOWS window being made invisible, all that will remain of the Virtual Machine window on the Macintosh desktop is the MICROSOFT WORD FOR WINDOWS window, see FIG. 2. Therefore, the user will see, on his desktop, the familiar APPLE desktop, with, for example, a window for Macintosh application 1, a window for Macintosh application 2, and a window for MICROSOFT WORD FOR WINDOWS. In other words, as far as the appearance of the MICROSOFT WORD FOR WINDOWS application, it looks just like any other Macintosh application on the Macintosh desktop, the only difference being that it is a WINDOWS application, not a Macintosh application. A screenshot showing one such MICROSOFT WINDOWS application (here, OUTLOOK EXPRESS) is shown in FIG. 11.

One issue that needs to be addressed is reconciling the resolutions of the non-native application window and the native desktop. For example, the desktop might be set to 1024×768, while the non-native application window is set to 800×600. In this case, one option is to maintain the lower resolution of the non-native application window at 800×600 (essentially, displaying an image of MICROSOFT WORD FOR WINDOWS on the desktop at lower resolution than the maximum permissible). Another option is to force the non-native application window to higher resolution of the desktop. The user can be given a choice of which he prefers. In a "full size" mode of the application, the VM can select from a set of possible resolutions for the non-native application window (in some cases same or different resolution as the desktop one, to improve video card performance).

As yet another option, network protocols, such as X-Windows support on UNIX, KDE, Gnome, Citrix Presentation Server with application streaming, etc. can be used. As yet another option, since the VMM or Hypervisor has access to the memory buffer where the image of the desktop is maintained, the relevant portion of the window that represents the guest desktop can be masked out, leaving only the non-native application window (or group of windows) displayed on the host desktop.

Figure 10:
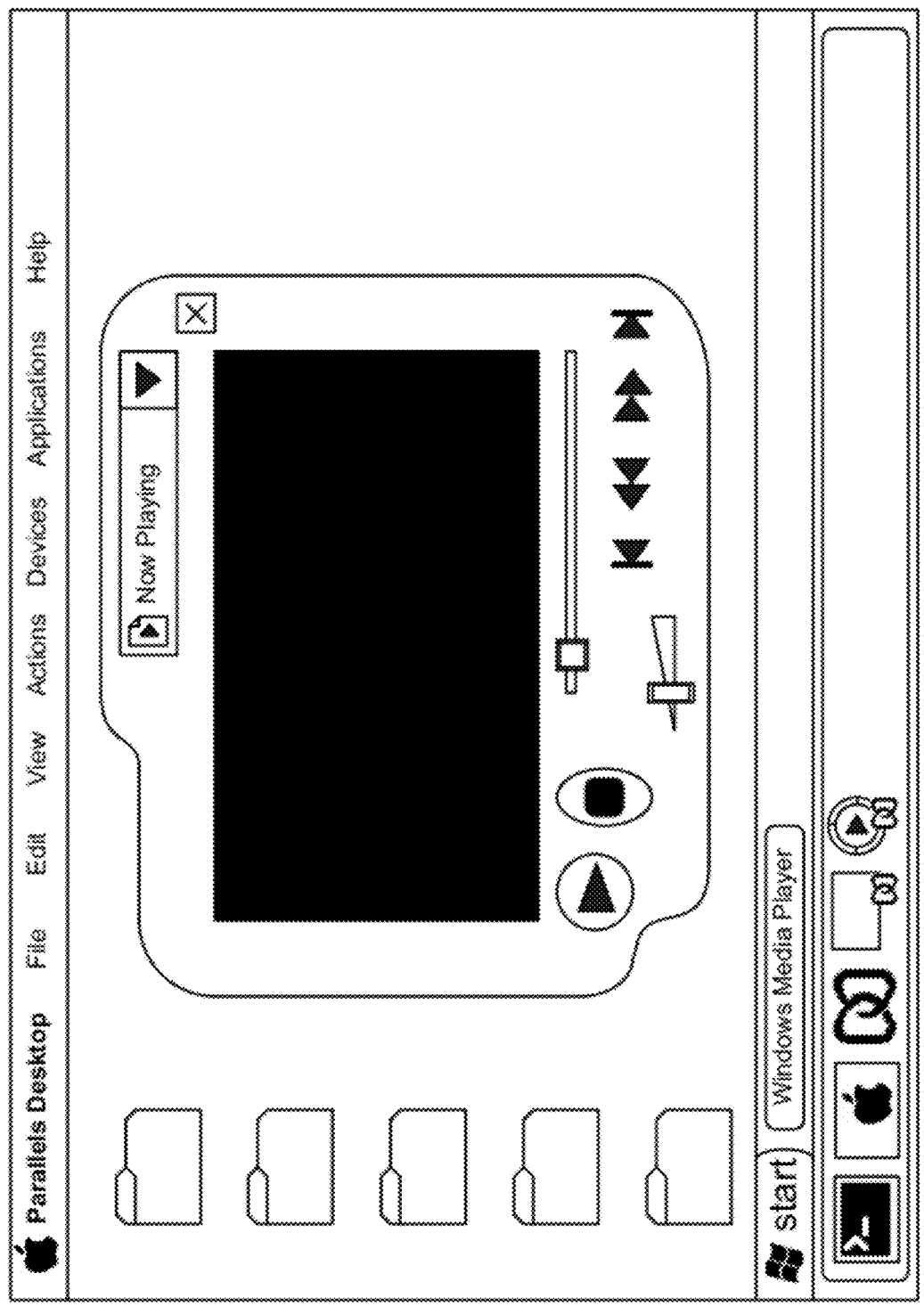

As one option, the VMM or Hypervisor can perform transport-collecting/secondary role, with two subsystems responsible for the window display functions: a guest window data collecting subsystem, e.g., as a part of virtualization environment, and tool gathered window information in the guest OS. The masked out portion can be regular shaped, or can be arbitrary shaped (for example, as with some skins that use a complex-shaped window, see, e.g., the example of Microsoft Media Player in FIG. 10, with the "skin" chosen so as to present a complex-shaped window on the screen).

If a new window is launched from within the non-native application, it is handled similarly—by changing the area of the invisible guest desktop that is masked out, or by using any of the other mechanisms described herein.

Figure 5:
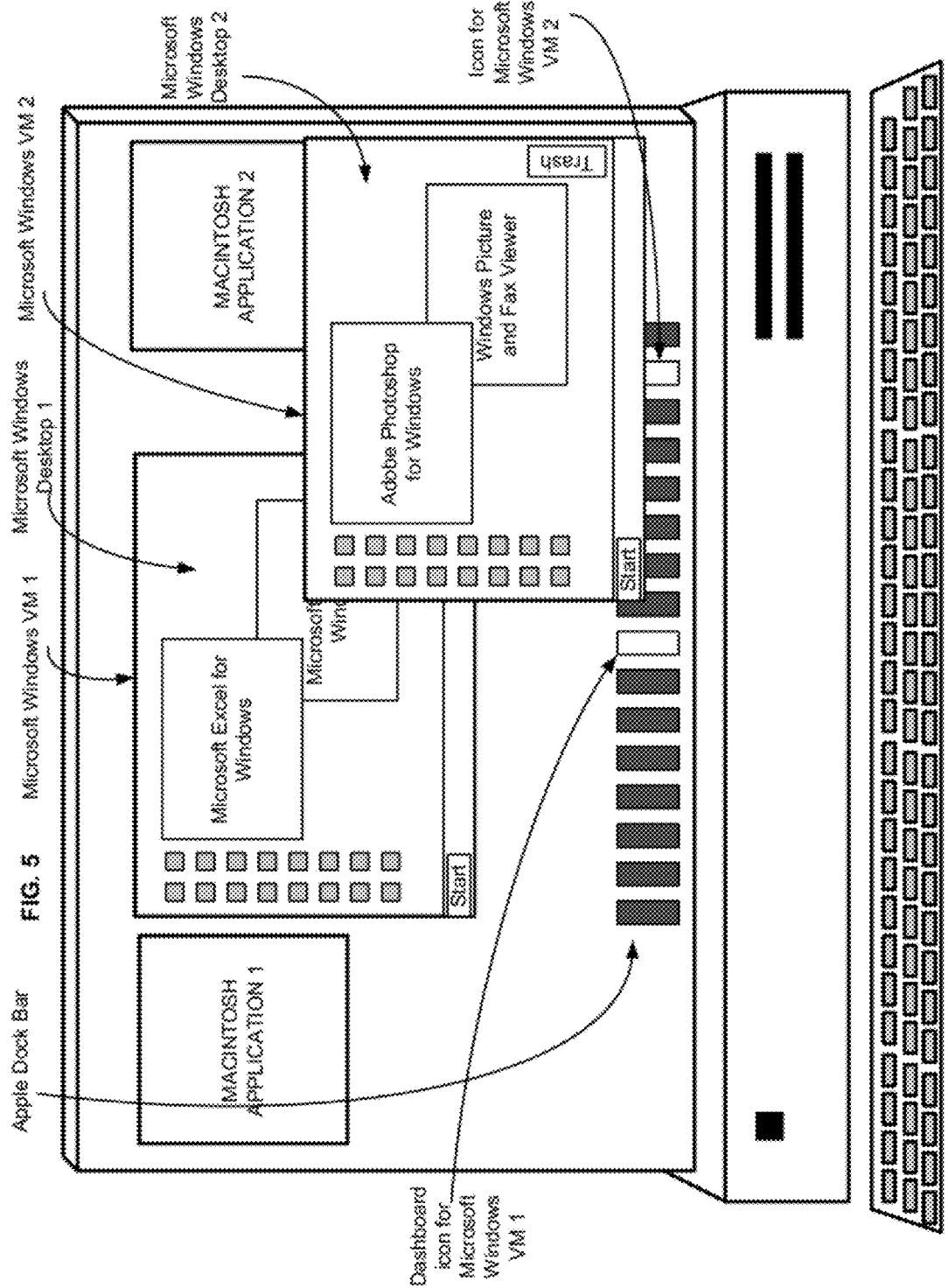
Figure 6:
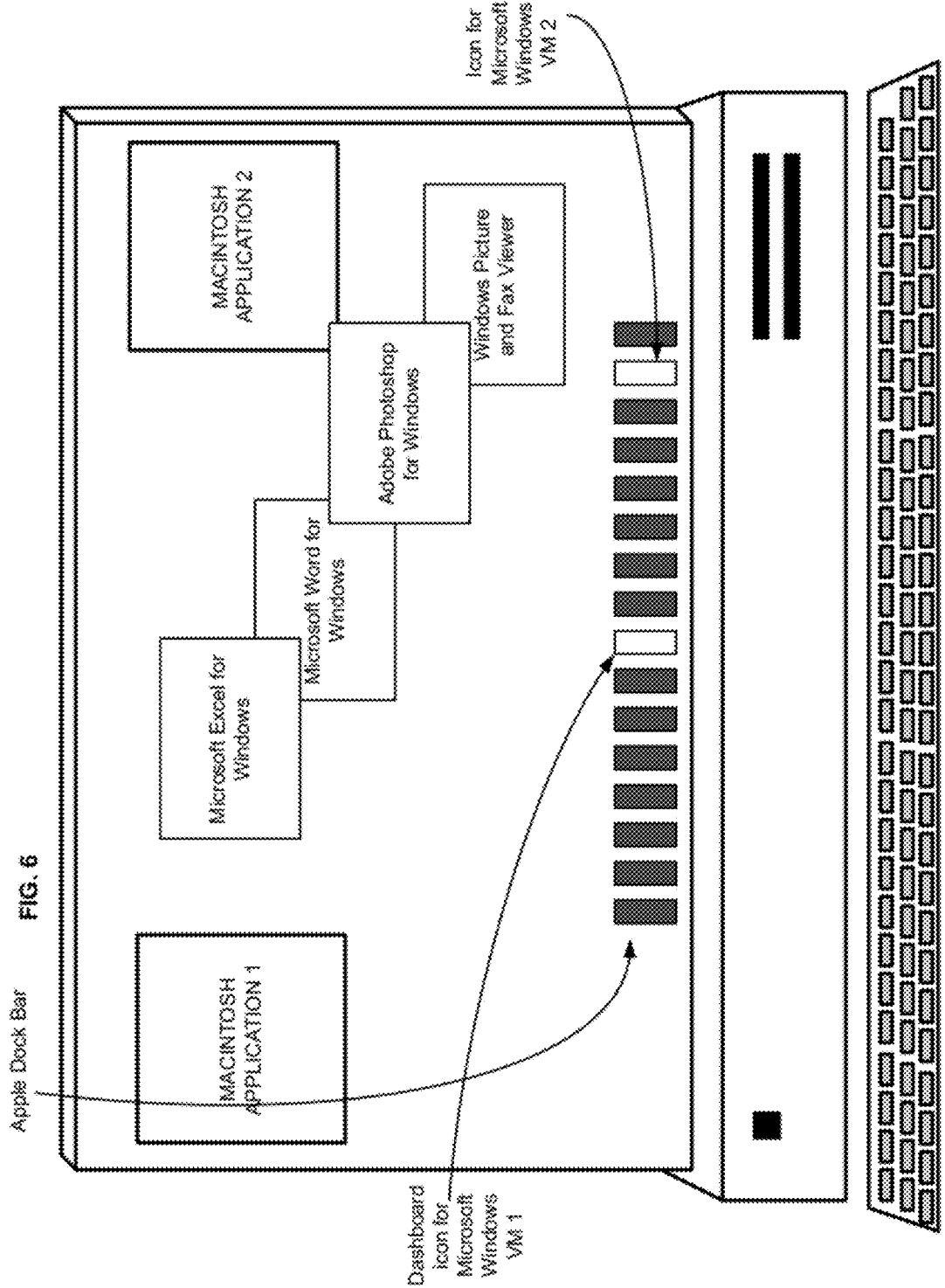

Similarly, if a user wants to launch multiple MICROSOFT WINDOWS applications, he has several options. One option would be to launch a separate Virtual Machine for each such application, see FIG. 5 and FIG. 6 (with both MICROSOFT WINDOWS desktops within their corresponding VMs invisible in FIG. 6). For instance, if a user wants to launch MICROSOFT EXCEL FOR WINDOWS or Adobe Photoshop for WINDOWS, in addition to MICROSOFT WORD FOR WINDOWS, a separate Virtual Machine can be launched, the WINDOWS desktop in that Virtual Machine can be made invisible, and, as far as the user is concerned, he will see an APPLE Macintosh desktop, with Macintosh application 1, Macintosh application 2, MICROSOFT EXCEL FOR WINDOWS, and MICROSOFT WORD FOR WINDOWS.

In one embodiment of the invention, integration of application may be more complex. For example, seamless integration may be required while using OLE objects or something similar. Object Linking and Embedding (OLE) is a distributed object system and protocol developed by Microsoft. OLE allows an editor to "import" part of a document to another editor and then use the object in edited form. For example, a desktop word editing system might send a picture embedded in the text to a bitmap editor using OLE. In the general case, all cooperative editors should run in one execution environment or under direct control of the same OS.

The present invention provides a possibility to call OLE object editors or even browsers from a VEE other than the VEE supporting the main editor. Furthermore, the user's OS, the main editor and OLE editor may be supported by different VEEs. In other words, the main object or file with OLE objects and the OLE object itself may belong to the user's VEE, while applications associated with the main object and OLE objects may be run by other VEEs and even by different VEEs for the main and OLE objects.

Furthermore, the user can have the option of turning the invisibility of the WINDOWS desktop in the Virtual Machines on and off, depending on the user preferences. This can be done with a button, an icon, a separate "Properties" option, etc. As yet another option, the invisibility can be partial—in other words, if the user still wishes to see some elements of the MICROSOFT WINDOWS desktop, the MICROSOFT WINDOWS desktop can be made partly transparent, for instance, 50% transparent.

Figure 3:
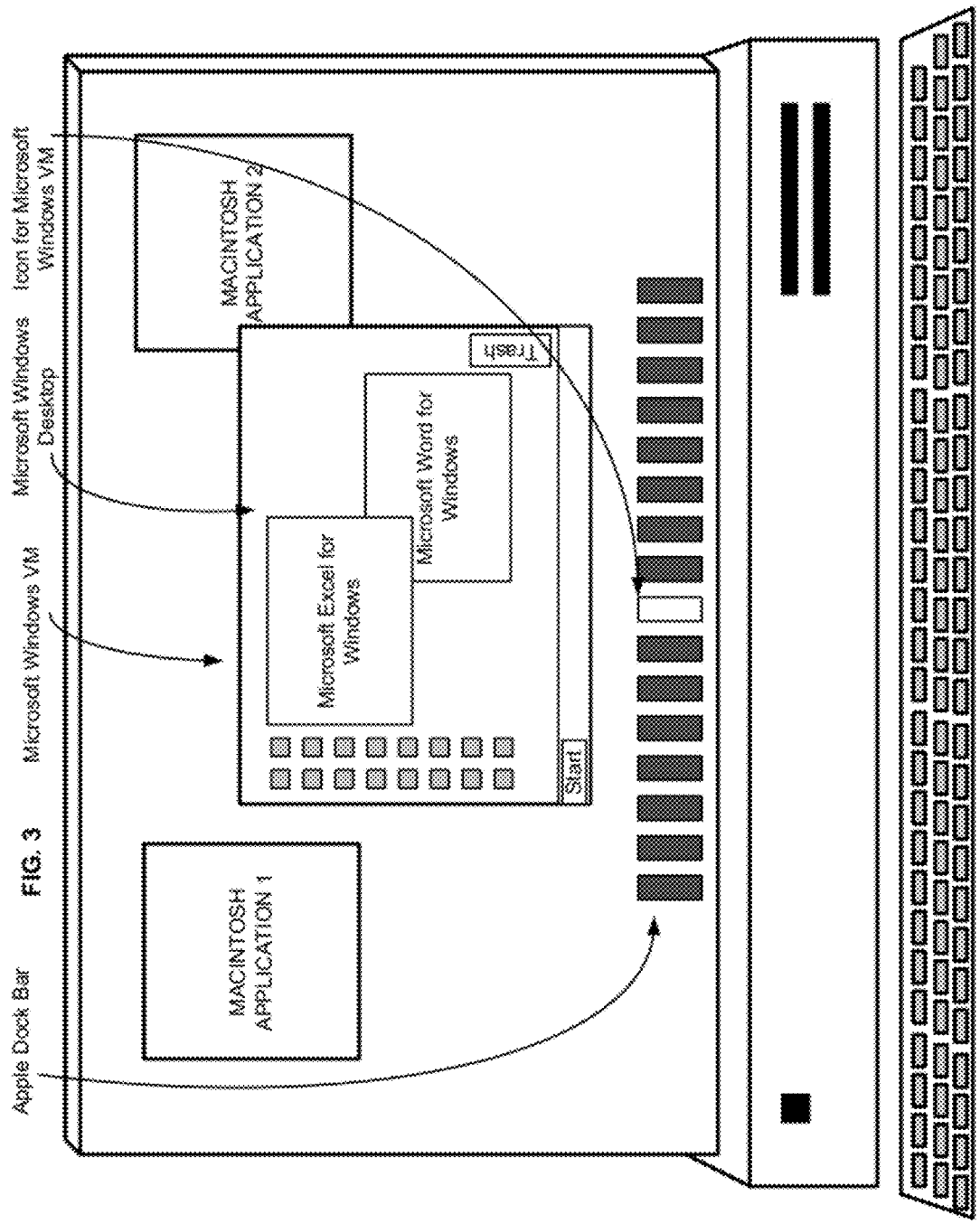
Figure 4:
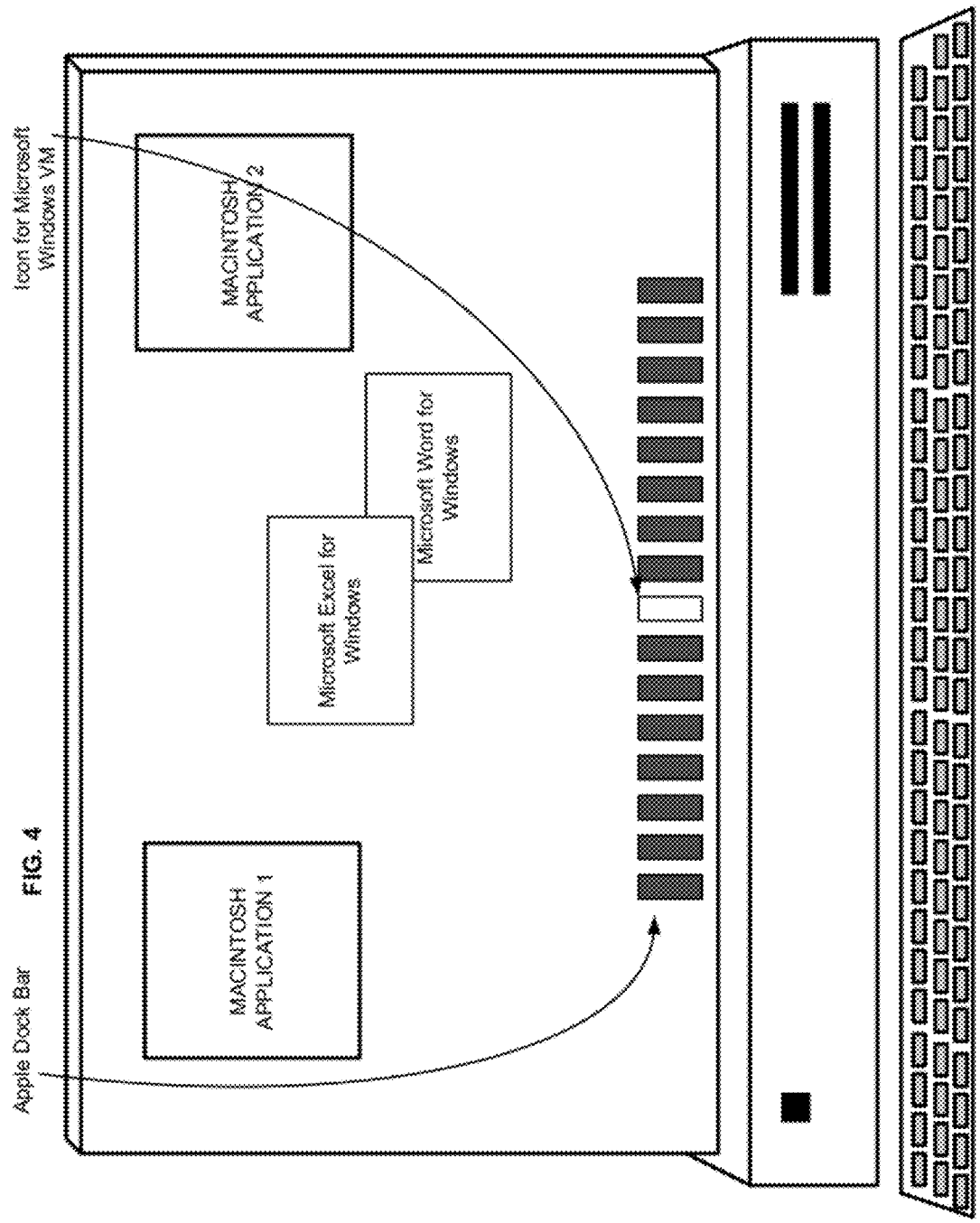

As yet another option, the separate MICROSOFT WINDOWS applications can be launched in the same Virtual Machine, see FIG. 3 and FIG. 4. In that case, however, it should be remembered that the Virtual Machine is treated as a single process by the Macintosh OS (which, in this example, is the host OS, sometimes also referred to as "Primary OS"), and therefore, there will only be one button on the Macintosh dock bar to represent that VM process.

Figure 7:
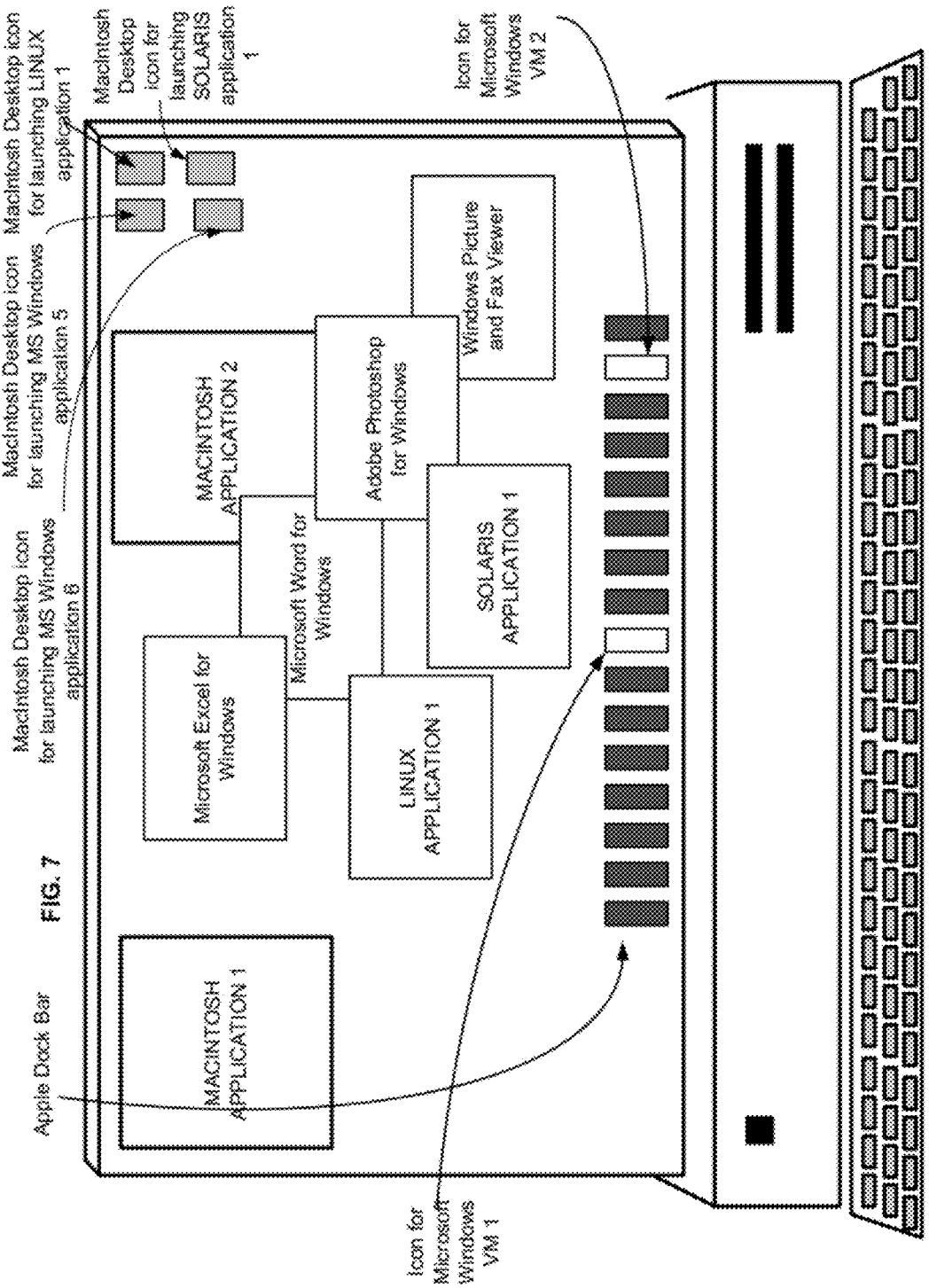

As yet a further option, there can be separate buttons on the Macintosh desktop specifically for launching the particular MICROSOFT WINDOWS (i.e., guest, or non-native) applications—for example, an icon, or button for launching MICROSOFT WORD FOR WINDOWS, an icon or button for launching MICROSOFT EXCEL FOR WINDOWS, an icon or button for launching Adobe Photoshop for Windows, etc., see FIG. 7. By clicking on that button, the user can directly launch the Virtual Machine, the particular WINDOWS application within that Virtual Machine, and this process can be automated—in other words, clicking on that icon or button will result in execution of all the steps described above, such that the user is ultimately presented with another window on the Macintosh desktop, with that WINDOWS application running in it. This is particularly advantageous for those users who do not wish to concern themselves with the exact mechanics of how the Virtual Machine, and the applications launched within that Virtual Machine, interact with the host operating system, but only wishes to see the final result—a seamless integration of a WINDOWS application into the Macintosh desktop and operating system.

Figure 15:
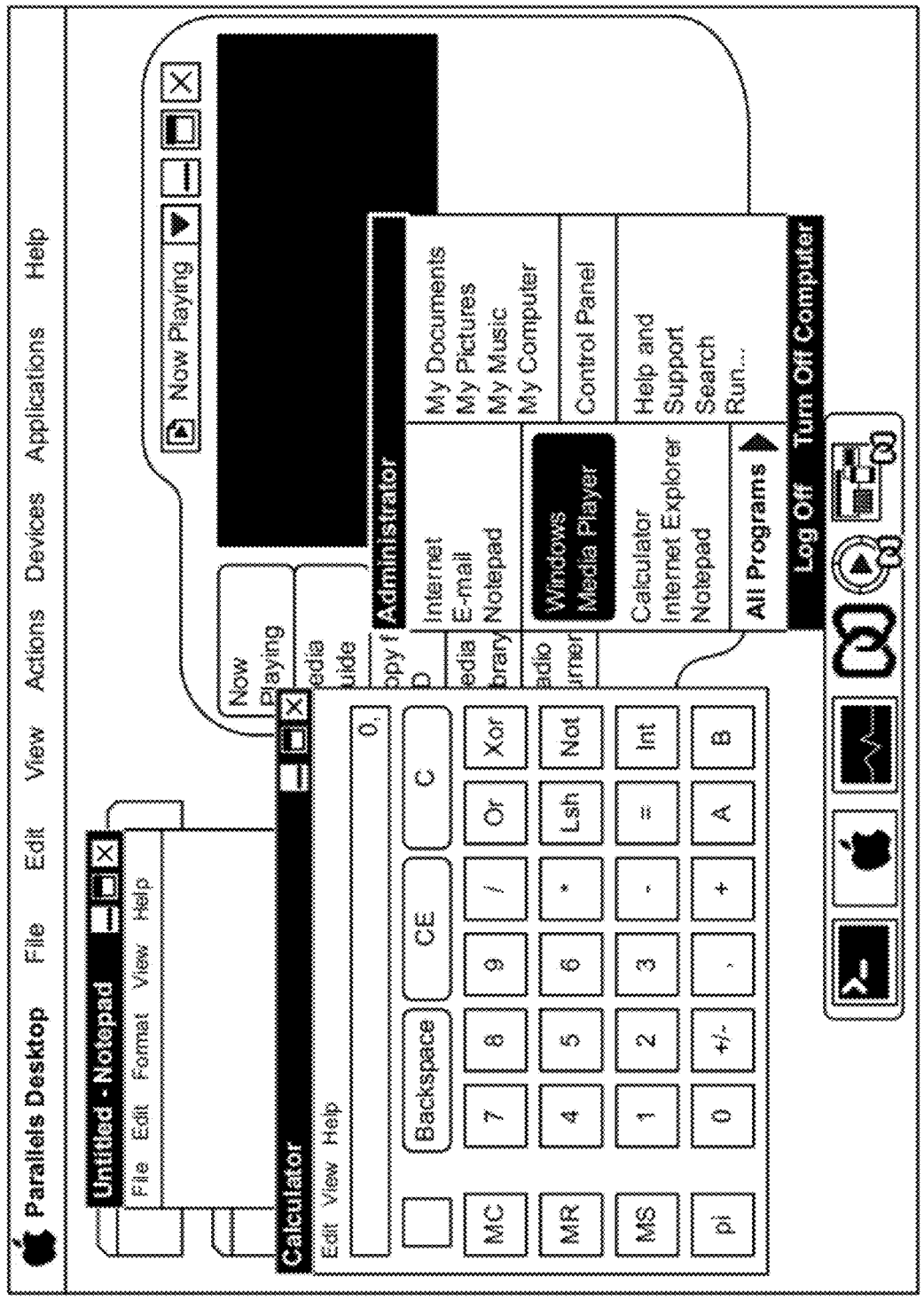
Figure 16:
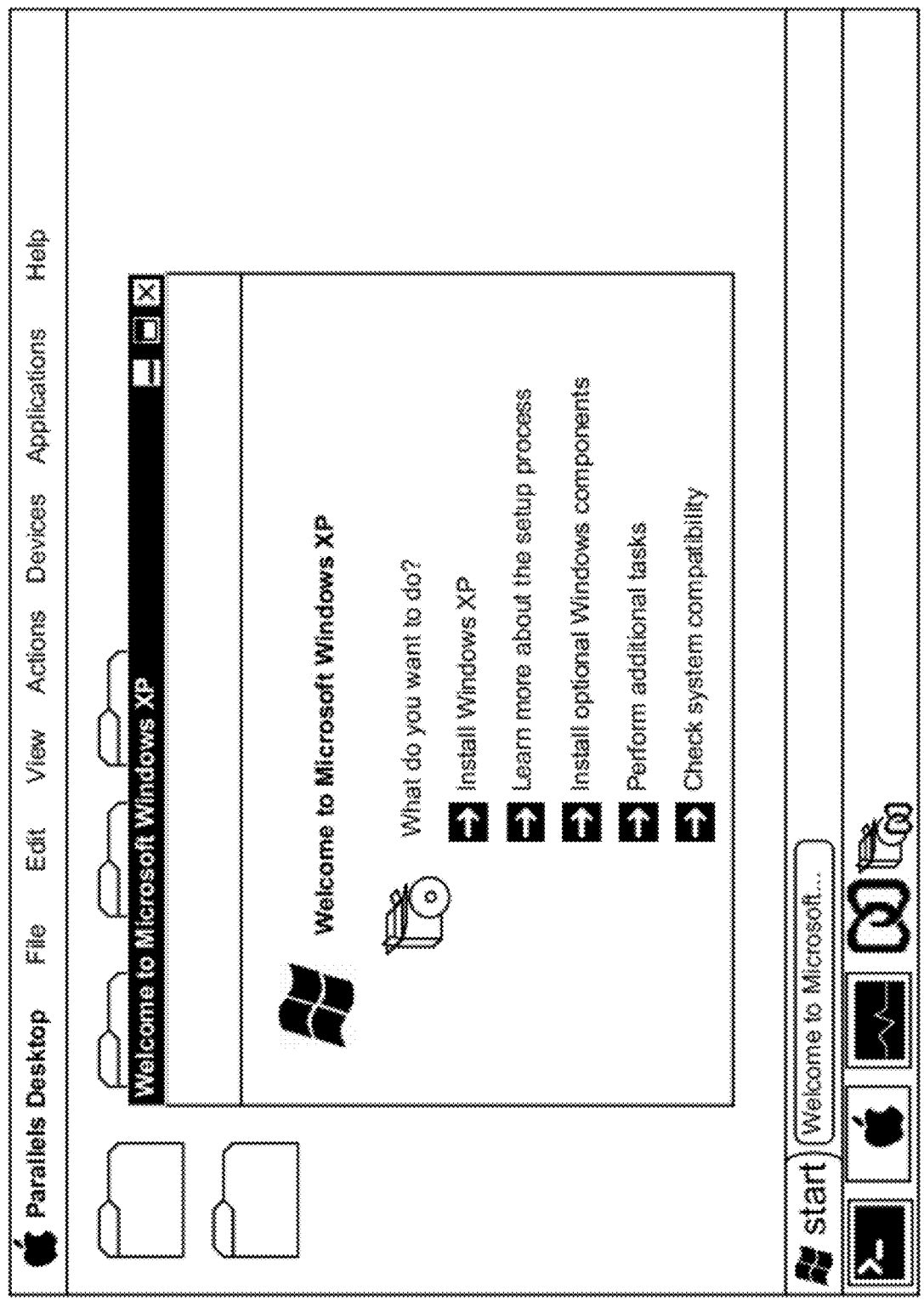

Furthermore, after running, each non-native application can use one icon of a running application (which appears after start of application), or a single icon can be used to designate all applications running from a single VM image, or, alternatively, one icon can be used to designate all non-native applications that are currently running. (See FIGS. 15 and 17)

Figure 12:
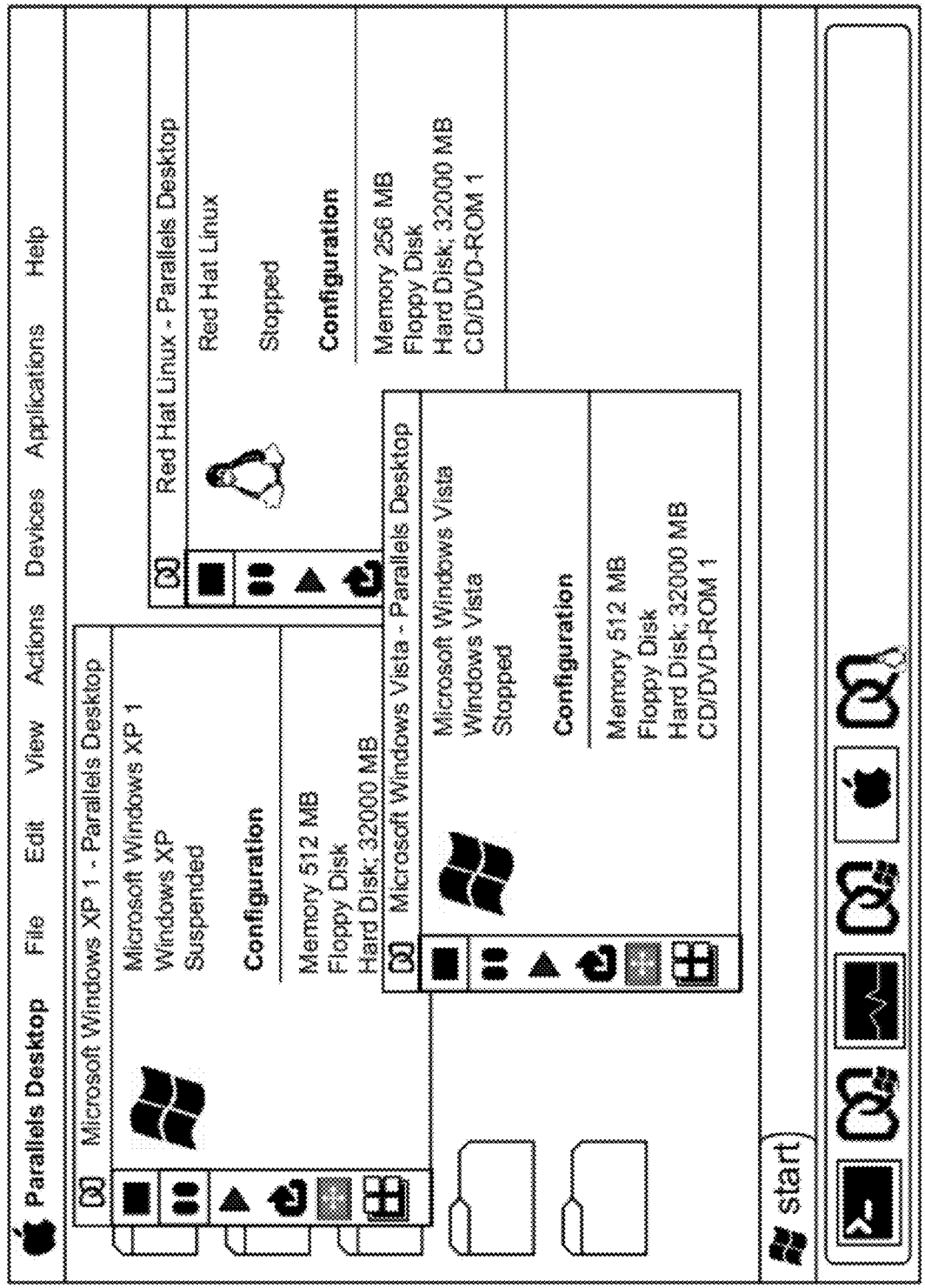

It should also be noted that although the discussion so far has been primarily in terms of integrating WINDOWS applications into the Macintosh platform, the invention is not limited to this example. For example, WINDOWS application can be integrated in this manner into a LINUX environment. Similarly, applications from several different operating systems can be integrated into a single desktop, for example, the Macintosh platform—in other words, one such Virtual Machine, within the Macintosh host operating system, can be running a guest WINDOWS operating system, and one or more WINDOWS applications, a second Virtual Machine can be running LINUX, and one or more LINUX applications, a third Virtual Machine can be running SOLARIS and one or more SOLARIS applications, etc.—however, as far as the user is concerned, he is presented an APPLE Macintosh desktop, with all the applications graphically seamlessly integrated into the Macintosh desktop, see FIG. 7. A screenshot of multiple VMS running different guest OS's is shown in FIG. 12.

As yet a further option, it is possible to handle full-screen guest applications by, for example, switching the host OS to full-screen mode.

Furthermore, different icons on the host desktop can be used to invoke different applications within the same VM. For example, the user can click on a MICROSOFT WORD FOR WINDOWS link→WINDOWS VEE is started→MICROSOFT WORD FOR WINDOWS is started→MICROSOFT WORD FOR WINDOWS is displayed to user. The user can then clicks on MICROSOFT EXCEL FOR WINDOWS→WINDOWS is already running→MICROSOFT EXCEL FOR WINDOWS is started→MICROSOFT EXCEL FOR WINDOWS is displayed to the user.

Indeed, the same application within different VEEs may have different icons. In this case, it may be useful to have a graphical representation of supporting VEE on the icon of the application. For example, this can be the symbol of VEE supporting application and/or number of the VEE running on the computer system.

Also, hardware devices, e.g., network adapters, storage drives, printers, etc. may have corresponding icons on the user's desktop even if they are supported by a VEE that is non-native for user. Since some devices may require support of certain applications (e.g., drivers) they may be started in different VEEs that are more compatible (or even the only possible one) for corresponding drivers or other control tools. In one embodiment, for example, a printed file may belong to the user's VEE, the application, that opens files for further printing may run in non-native mode for the user VEE, and printer support means, e.g., network drivers and printer driver, may run in other VEEs. In certain cases, the user can be provided with a GUI for configuring devices and choosing an appropriate VEE for installation. In the case of plug-and-play devices, the choice may be defined by default.

As yet another example, the user can click on a MICROSOFT WORD FOR WINDOWS file link→WINDOWS VEE is started→MICROSOFT WORD FOR WINDOWS is started→MICROSOFT WORD FOR WINDOWS is displayed to user→Word loads the MICROSOFT WORD FOR WINDOWS file from the user's VEE or from WINDOWS VEE.

As yet a further option, starting the guest OS and the non-native application can be done in the background. This will result in showing only the non-native application to the user—no guest desktop will be displayed at all.

One issue that also needs to be addressed for full seamless integration is interaction between objects within the Virtual Machine and objects of the host operating system. For example, with no Virtual Machine running, but only native operating system and native applications running on, for instance, APPLE Macintosh, the user can perform such functions as drag-and-drop and copy and paste from one application to another. In practice, this means that the user utilizes services of the host operating system to associate various objects with various applications. For instance, the user can click on an image within an application (e.g., a JPEG image) and drag it to a window of another application.

In the case of the source application for the drag-and-drop running inside a Virtual Machine, however, that application is normally isolated from the rest of the native applications running on the APPLE Macintosh (in this example). Therefore, for full seamless integration, the Virtual Machine Monitor needs to intercept such an action by the user, and then handle it, for example, by recognizing an event (a drag-and-drop within the MICROSOFT WINDOWS application that crosses the window boundary), informing the host OS of that event, and invoking a native drag-and-drop process. Once the drag-and-drop is completed, the VM is informed, so that it can update its own objects. A similar process can be done in the case of copy-and-paste, from within the VM to outside the VM. In a similar fashion, objects can be dragged and dropped from the desktop to the non-native application, or from one non-native application to another non-native application. Drag-and-drop may be used instead of direct association of objects of predefined type (e.g., file with certain extension, or a directory with certain attributes) with certain application if multiple application or even same applications in different VEEs may be used for processing an object.

Furthermore, it should be remembered that when an operating system, such as MICROSOFT WINDOWS, is launched within a Virtual Machine, it has its own file structure, which is separate and distinct from any file structure of the host operating system. Therefore, normally, if a user were to try to save a document from MICROSOFT WORD FOR WINDOWS, where MICROSOFT WORD FOR WINDOWS is running within the Virtual Machine, the file would be saved to a MICROSOFT WINDOWS file system, not to the host's APPLE Mac OS one. For full integration, the file would need to be saved into the APPLE Mac OS file system. This can be done, for example, by defining one of the folders in the host OS file system as a shared folder, and giving the VM access to it. As another alternative, the entire file system tree can be defined as a shared folder, with a process that goes through the tree hierarchy, starting with the root folder, and sets the properties of each folder and subfolder to "shared." Alternatively, the VM's file system can be integrated using transparent copy-to and copy-back integration between the host OS and the VM, or between one VM and another VM.

Figure 13:
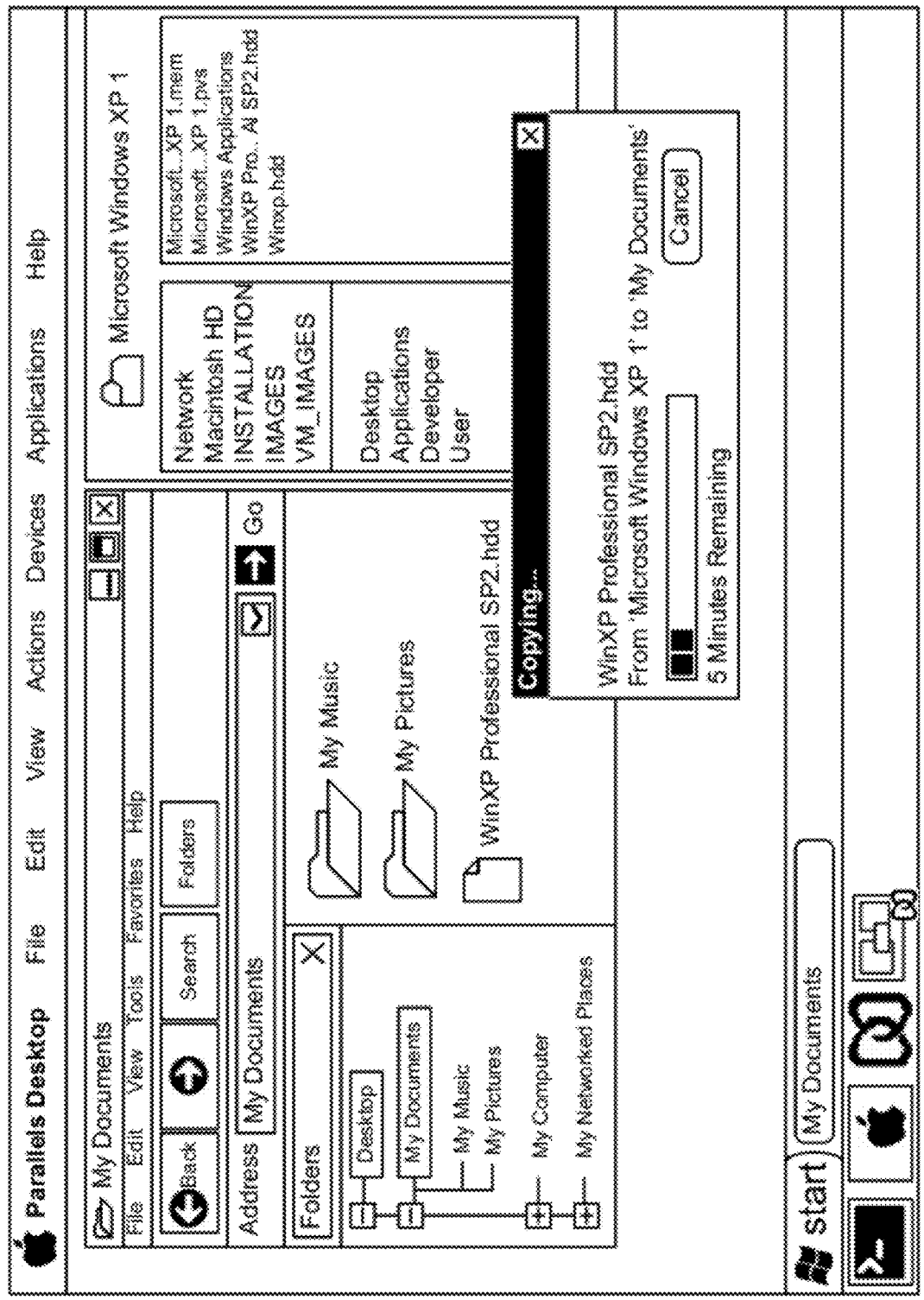
Figure 14:
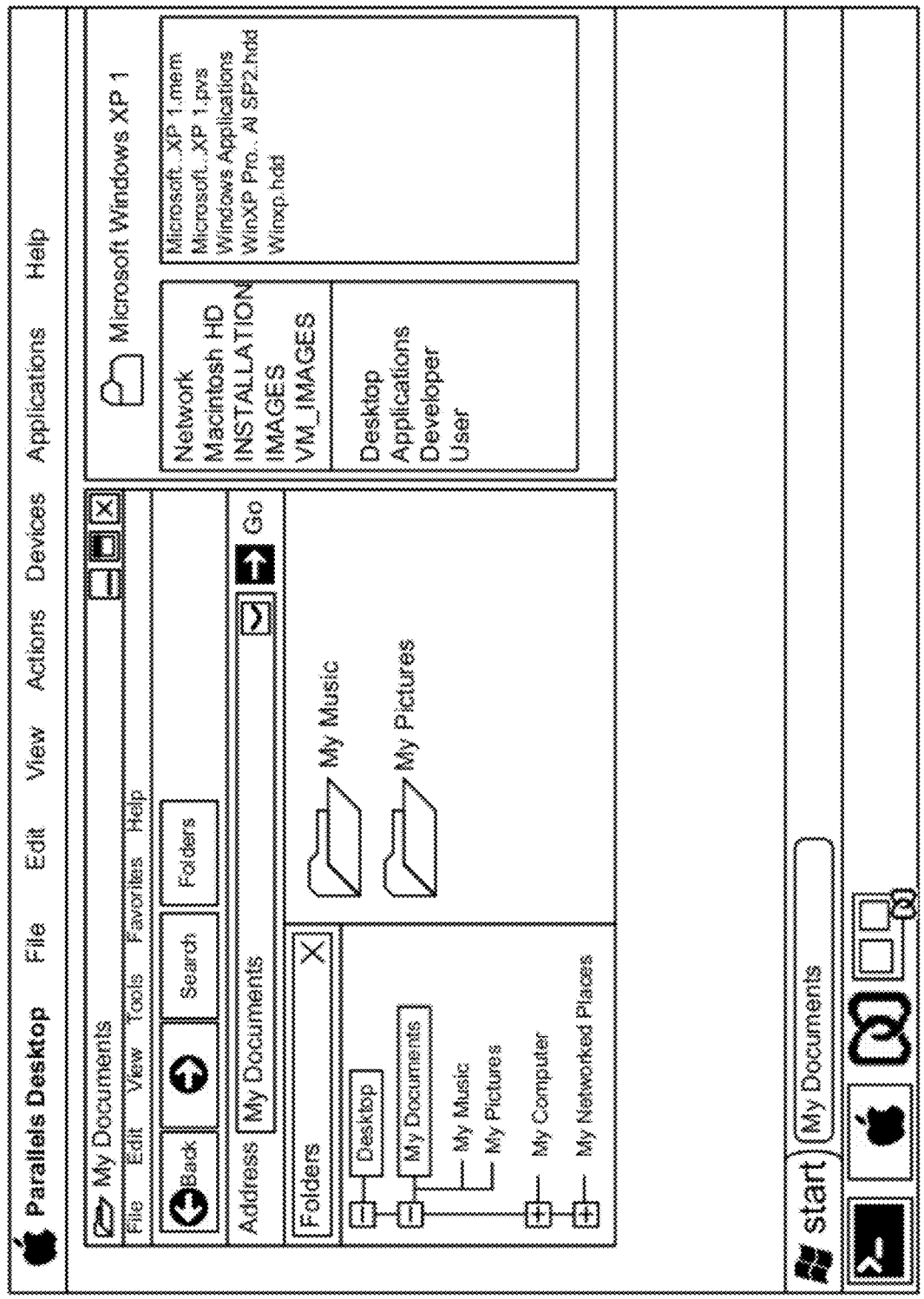

An example of such a drag-and-drop is illustrated in the screenshots of FIGS. 13 and 14, where a file called "Win XP Professional SP2.hdd" is dragged from one VM running WINDOWS XP to another VM running WINDOWS XP—in the case of the target VM, its file structure is integrated into the host OS file structure.

Although in the discussion above, a Virtual Machine was used as an example of how the non-native application can be launched within an isolated environment, it should be remembered that Virtual Machine is only one example of such an environment. Other Virtual Execution Environments can also be used, for example, Virtual Private Servers, such as those supplied by SWsoft, Inc. Also, the present invention is not limited to any particular type of Virtual Machine—for example, conventional Virtual Machines can be used, Hypervisor-based Virtual Machines can be used, Lightweight Hypervisor-based Virtual Machines can also be used, VMM-based VMs, Hypervisor-based VM with and without hardware virtualization support, with or without security support (e.g., using Intel Lagrande technology, VM/lightweight VMM/AMD secure execution support/etc.), as well as different VPS/VE such as VIRTUOZZO from SWsoft, Inc., Sun container-based environments, HPUX internal container environments, jail-based environments, terminal sessions of MICROSOFT WINDOWS Terminal Server and/or Citrix Presentation Server or similar.

For inter-VEE communications (and VEE-to-host desktop communications), special stubs/proxies can also be installed, which allow fully controllable (based on appropriate communications rules) means of communications (Inter-Process Communication), thereby giving the applications transparent communications abilities. These proxies/stubs allow the applications to interact in the same manner as they do in normal computer system (for example, users can use clipboard copy/cut/paste operations between different applications running in different VEEs entirely transparently). This can be done, for example, using a shared memory buffer, network means, socket means, etc.

To start a non-native application, a user can use the same icons, menus, file system structure, and/or command lines, and these applications will be visually launched on the standard graphical end user computer on which the user typically works. The installation and start of any application will define an appropriate VEE, in which context this application should be installed and run, as well as appropriate communication proxies. A set of installation/behavior rules will allows automatic selection, creation and start/termination of appropriate VEE.

Different VEEs can also be separated based a "level of trust" for the particular application. This can be based on such criteria as source of application (e.g., downloaded applets via web browser from unknown sites, from trusted sites, with different requirements for OS resources and access to file system and registry, etc, time of activation, estimated load, possible network access level and so on). This approach provides a greater level of separation (and isolation) of applications and resources than, for example, the Microsoft in .NET applications or the "security zones" in Internet Explorer, because it works on application level, not just inside a browser or .NET applications context. However, the present approach includes the browser and .NET applications as well.

The concept of the VEE can therefore, in one embodiment, be used to create secure "zones" in which the applications "live." For example, if desired, each application may exist as a process within its own VEE. In this case, there can be a single VEE for MICROSOFT WORD FOR WINDOWS, a single VEE for MICROSOFT OUTLOOK (or OUTLOOK EXPRESS), a single VEE for a web browser, etc. Alternatively, applications of a similar type may be launched within the same VEE. For example, MICROSOFT WORD FOR WINDOWS and COREL WORDPERFECT can be launched within the same VEE. Similarly, different email clients can be launched within the same VEE, or each within its own VEE.

Also, for fully seamless integration, the user should be able to drag-and-drop, copy and paste, from one application inside one Virtual Machine to another application inside another VM—for example, taking text from MICROSOFT WORD FOR WINDOWS, copying it, and pasting it into a LINUX OpenOffice application.

By clicking on a desktop link or icon, a native system launcher can be invoked, which can accept an argument (e.g., an application name, a configuration file for a VEE, a VM, etc., name of the file to be edited from the native system or the non-native system, name of file together with the application that will be used for editing), and perform the activities necessary to activate the VMM, launch or recovery of the snapshot of the VEE instance, launch of the application within the VEE with optional pre-configuration and file access, etc.

The user application window can be shown partially on the host desktop. For example, the user needs to see only the "valuable" part of the application and in most cases this excludes window title and window border. Often, the second VEE differs from first VEE. Therefore window title and window border, which create a "look and feel" of the window and look as a foreign window for first VEE, can be eliminated from the display seen by the user. Furthermore, the window title and window border can be changed to create a more native look-and-feel of the user application.

User applications can be shown in different ways on the host desktop. The following examples are not intended to be exhaustive: a pixel set (image) drawn on the second VEE desktop; a graphical primitive set (e.g., points, lines, rectangles, icons, bitmaps, text lines and etc.); OpenGL primitives; commands for hardware 2D/3D graphic accelerators (DirectX compatible or the like); window set translated to correspondent first VEE window set; etc.

The previous paragraph describes an example of how the user application window view can be captured. More generally, the user application, in combination with second VEE, generates a view of its window, this view is captured in some manner by the virtualization system described herein (for examples, see paragraphs above), and the virtualization system simulates/images captured output connected to the corresponding window.

It should be noted that the approach described herein is applicable not only to different host/guest OS's, but also to the situation where the guest OS is the same as the host OS (e.g., an MICROSOFT WINDOWS host desktop and an MICROSOFT WINDOWS VM and Guest OS). Also, the entire desktop can be superseded by the guest desktop. Also, the desktop can be non-native as well, or a VM can be launched within another VM ("nested VMs"). Also, the same OS in guest and host can use direct access of VM support means to video and implement external integration of VM. Note also that the VM can be started "from scratch," or can be started from a snapshot, or some pre-defined checkpointed image.

One desirable feature from the perspective of a user is to have various applications written for different operating systems being available for the user of a certain VEE. Those applications should run in an appropriate VEE, but the process of installation (preferably automatic) should be accompanied by providing a possibility of starting the application from inside the user's VEE. For example, if one OS running on the computer, e.g., the host OS, is the Macintosh OS, and the user's OS/VEE is running Linux, the user might want to edit a MICROSOFT WORD FOR WINDOWS document with a .doc extension. In this example, neither the host OS nor the user's OS natively supports this file extension since neither is running (or is capable of running) MICROSOFT WORD FOR WINDOWS. In this common case, the system automatically recognizes that there is no appropriate application for opening the file with such an extension and, for example, that the application required for editing the file could not be installed in user's OS since it is compiled for (or otherwise compatible with) an operating system that is neither of the two (or however many) are installed and running on the physical machine.

In this case, the first step is for the system to recognize that the application being invoked is written for another operating system (or possibly, for another version of the operating system, or, possibly, is one that for whatever reason, such as security considerations, needs to be installed and activated in a different VEE). For example, a user who is running Mac OS as the host OS, and Linux as the guest OS inside the VEE, clicks on a .doc file, attempting to activate MICROSOFT WORD FOR WINDOWS associated with this file extension. The system would then check that there is another VEE already running that might be compatible with this application. If there is one, then the application can be installed (if it isn't already) in that VEE. If there isn't, then the system needs to first install the VEE. After installing the VEE, the application (in this example, Microsoft Word) can be installed in that VEE.

As an alternative, the allocation may be invoked by using autorun media. For example, upon inserting in the DVD drive, autoplay DVD will launch the user application that may be installed in the VEE or may be stored on the DVD and requires the VEE OS for launching and running. In one embodiment, autorun media may contain a snapshot of the VEE that may be restored on the computing system. The same mechanism of invoking the user application may be implemented while using autoplay media.

In some embodiments, starting the VEE and/or installing the user application may be provided when a user invokes a user application that is non-native to the host OS and/or to other OSes, e.g., already installed VEEs. Then the user application may be started. The application may be indicated by the user or may be chosen from the database related to certain application required for certain file types, connected devices, used media and so on.

After installation, the relevant configuration issues are addressed, such as generating or installing appropriate configuration files, ensuring that the register settings are appropriate, etc. The host OS also needs to make sure that its config settings are compatible with the newly installed VEE and applications. A procedure of installation the application in the appropriate OS (or just activating the application in user's OS) can involve "tuning" of the user's OS and the host OS being responsible for supporting multiple VEEs on a single computing system. For example, from the view of the user's OS, the application should be registered as a default application for opening files of a certain type (in this example, files with .doc extension). Preferably, the application should have settings, corresponding to a user's profile, required for starting and functioning of the opened application.

For example, if an antivirus application is servicing OS processes of other VEEs, scheduler, security policies, etc. should be registered for that VEE. For example, this can include a set of tools required by user, graphical representation settings, auto-save parameters, integration with other applications (plug-ins, browsers) and so on. Since similar applications, such as word processors of different versions may be installed in different VEEs, an appropriate VEE for starting the application may also be defined. In addition, depending on implementation of multiple VEEs, and the host OS, part of the virtualization environment/system (Hypervisor or the VMM, etc.) can should provide inter-VEE communications (including simultaneous usage the application by multiple VEEs), and maintain a control structure that operates with data sensitive to the context of the VEE that calls the application.

It is also worth noting that as far as the user is concerned, the application (e.g., MICROSOFT WORD FOR WINDOWS) is local to his machine, although, in practice, this need not be the case. The application can be local, running inside one of the VEEs, or the application can be remote, for example, running in a VEE on a different physical machine, for example, on a network server, and, in this case, the user can manipulate/communicate with non-native application through a so-called remote console. Also, it should be remembered that the process of first installing a VEE from scratch, and then installing an application from scratch may be relatively time consuming. However, as discussed in U.S. patent application Ser. No. 11/264,100, filed on Nov. 2, 2005, entitled SYSTEM AND METHOD FOR PRE-INSTALLING OF VIRTUAL PRIVATE SERVER FILES, incorporated herein by reference in its entirety, VEEs can be "cached", such that virtually everything that needs to be done to activate and launch a VEE is already "pre-done"—in other words, the config files are set up, the data files of the VEE are copied, etc.—all that remains is to finish the configuration of the VEE, and launch it, a process that is not very time consuming at all. Similarly, if an application needs to be installed from scratch, this can be relatively time consuming, however. Template files of a VEE can be used for installation of an application, shortening the process considerably. This feature may be used when the same hardware system has multiple similar OSs installed in different VEEs. In this case, the installation of the application in the required OS needs simply adding links to the directory and registry hive templates. If the application is initially installed on the hardware system, using such templates may be advantageous over traditional installation.

As yet another aspect of the configuration, the host OS, and/or the guest OS for which the installed application is not a native application, needs to have a link to the newly installed application, which may be, as noted earlier, running locally on the same machine, or running remotely on a different machine, such as on a networked server.

Optionally creating the link to the VEE can be followed by updating security settings of the non-native VEE, e.g., firewall rules, security policies and so on. Furthermore, creation of links to the application can be accompanied by additional registry settings or libraries' updating. For example, file associations, default setting or other parameters required for full integration the program in non native VEE may be modified. Also, in the process of installation of an application program in a VEE that is not compatible with that VEE's OS, checking or predefining other VEEs and installation the program in a compatible VEE can be done, for later starting the application from a non-compatible VEE.

The user may see a set of prompts during application installation. For example, the user may be prompted to virtually install the application in another VEE that is already installed on the hardware system, to start installing a VEE compatible with the application, and so on.

As an option, installation of a reduced OS required for the application support may be performed as well. Thus, the VEE on which the new application has been installed may have a full operating system, or may be an operating system with reduced capabilities, for example, only those capabilities that are necessary for that particular application. This can simplify the installation of the guest OS considerably, and shorten the time that it takes to do so. It should also be noted that many of the modern operating systems occupy hundreds of megabytes of disk space, and occupy several megabytes of memory when running—even though frequently not every application requires every capability. This enables installing and running an "abridged" version of the operating system, geared towards the particular application at issue.

The process of installation of the application in a newly created/launched VEE can also involve creation of links in other VEEs and/or in the host operating system, with the links pointing to the application. Also, other administrative tasks need to be performed, so that the application can run properly—for example, the communication channels need to be specified and set up, the application may need to be given access to one or more ports, the security policy of the machine may need to be configured to reflect the fact that a new application may be accessing various communications hardware of the computer, various daemons may need to be launched to support the application within a certain VEE, etc. Examples of such mechanisms are also described in U.S. patent application Ser. No. 10/703,594, filed on Nov. 10, 2003, entitled Virtual Private Server with Isolation of System Components, incorporated herein by reference in its entirety. Also, U.S. patent application Ser. No. 09/918,031; Filed: Jul. 30, 2001, entitled Virtual Computing Environment, incorporated by reference herein in its entirety, and/or U.S. patent application Ser. No. 10/837,757, Filed: May 4, 2004, entitled Virtual Private Server with Enhanced Security, incorporated by reference herein in its entirety, illustrate examples of VEEs where the invention may be used, and also illustrates isolation of various processes running on the same hardware machine.

Firewall rules, anti-virus definitions, and other security policy aspect of the computer may also need to be updated.

Furthermore, the creation of the links to the newly installed application may be accompanied by appropriate registry settings and library updates. Furthermore, to fully integrate the new application with other non-native VEEs may also require that those other VEE recognize the existence of the new application, and associate certain parameters with it. For example, other VEEs may need to associate the .doc extension with Microsoft Word that is running in a newly launched VEE. In this case, in the process of installing the application in one of the VEEs, the user of hardware system may be prompted if the application should be registered in other VEEs. For example, a graphical representation of a list of VEEs that may be active on the computer, along with checkboxes, may be presented to the user on a display during installation.

As yet another option, if the system determines that the entire virtualization suite needs to be installed, it may do so—for example, the process may or may not support hardware virtualization, the full virtualization approach may need to be taken, an entire Virtual Machine may need to be launched "from scratch," that, for example, fully virtualizes the entire processor and the hardware of the computer, etc.

Furthermore, the installation process can involve defining associations required for calling non-native application objects. For example, this can include file type association, default editor or mailing program, plug-ins, etc. For example, MICROSOFT EXCEL FOR WINDOWS can be associated with .xls files viewing and editing. As an option, alternative default programs may exists in different VEEs, e.g., different versions of MICROSOFT OUTLOOK. Note that the Graphical User Interface can be implemented not only on network servers, but also on single workstations. The hardware system (e.g., single node, cluster of nodes, or single node with cluster of CPUs) has display means and performs operation with GUI support.

Also, it should be noted that the same file type extension may be associated with different VEEs, in other words, with different installed applications. For example, in one VEE, the link can point to a VEE that is running locally, while in another VEE, the link can point to a remote VEE with the application. This may be useful for security considerations—for example, files on a local drive can be opened with one VEEs application, while files received through email (and presumably running a high risk of virus infection) can be opened with a different, e.g., remote, VEEs application. Also, even for the same file extension, different applications can be used. For example, an Open Office (Open Source) word processing application, can work with many .doc files, however, some of the more advanced aspects of Microsoft Word's files require the full version of Microsoft Word.

Furthermore, the host OS can be responsible for the graphical user interface, or the VEE can be responsible for it. In other words, the question of how to distribute responsibility for display of the desktop, icons, guest desktop, etc. can have different solutions. Furthermore, it is possible to have some aspects of the graphical user interface as the responsibility of one VEE, while other aspects are the responsibility of another. For example, the window appearance of UNIX type applications and WINDOWS type applications is not exactly the same—the scroll bars, command bars, etc. of the windows are somewhat different. It is also possible to have the application itself (e.g., a WINDOWS application) be responsible for the contents of that is displayed in that application's window, while a different application, for example, Mac OS, is responsible for the appearance of the scroll bars, and other features of the window itself—this provides a more consistent user interface, if the user so desires. This feature can also be turned on and off, at the user's discretion.

Furthermore, other aspects of the graphical user interface can also be integrated. For example, the dialog boxes in UNIX and the dialog boxes in WINDOWS are different (even when they accomplish the same function). In this case, a user may prefer to see dialogs in UNIX style (if that is the user's operating system) while calling WINDOWS application from an external VEE. If the user asks for "native" interface when calling the "non native" applications, the VEE that has the primary responsibility for that aspect of the graphical user interface will substitute a WINDOWS interface instead of the graphical representation of the UNIX interface. Another interface issue is that user's file system structures (shared for that user and/or private) should preferably be visible to the user as the only available structures.

For example, as an option, when a user logs into the system, if multiple different operation systems are running (as either host or guest OS's), the user can be offered a choice of which type of graphical user interface he prefers—for example, Mac OS, Windows, LINUX, etc.

As yet another option, even if not all of the possible choices of graphical user interface and their corresponding operating systems are running at that moment (but can be launched), that choice can also be presented to a user, and the relevant guest OS started, if necessary, just for the purpose of the graphical user interface (and optionally for other purposes as well, but possibly solely for that purpose).

As yet a further option, an icon for launching the particular application can include some indication of which operating system needs to be launched in order to enable that application, and this is particularly useful if that operating system is not at the moment running in one of the VEEs. On the other hand, if the relevant guest OS is already running, then the indicator might not be displayed with the icon.

As yet another option, the VEE that is launched primarily to enable installation of a particular application can itself be an "abbreviated" version of a general purpose VEE, particularly where all of the functionality of the VEE is unnecessary in order to install and run the application at issue.

For example, the VEE can contain a limited version of the operating system's binary code. In other words, the installation of the application can be wrapped in an installation of the VEE (full or limited version), guest operation system (full or limited version) and the application itself.

For example, a specific type of a DVD is inserted to the drive and the first VEE does not recognize this DVD format. Such type of a DVD can be associated to play this format inside a second VEE. Another such example is an "unknown" USB device for the first VEE but which is known to the second VEE.

Furthermore, the second VEE can be launched automatically by the first VEE that detects the unknown device in a plug-and-play manner. The medium or device is inserted or connected to the corresponding hardware. Special software hooks the insertion event, detects the type of inserted medium or device, and, if there is an association between such a device type and the VEE, launches the second VEE to worth with corresponding device.

Furthermore, the VEE, even if running remotely, on a networked server, can have access to a local hardware device, such as a local disk drive with files, or a local CD ROM drive, etc.

Most modern VEEs provide a means to select which tool the user wants to use for recently inserted medium. A dialog window pops up to interact with the user, showing a list of registered applications for maintenance of an inserted medium. The second VEE associated with such medium or device can be one from the list.

Medium (device) type term can be specified any complex condition. For example, it can vary from device class to device identifier or from medium class to data content of the medium.

As yet a further option, a file of the host OS required for handling the user application running in the VEE may be shared for common access of the host OS and the VEE. If the security policy protects the host OS and the VEE from sharing files, an additional communication channel for transmitting file data may be implemented.

Furthermore, in an alternative embodiment, when multiple user applications are invoked from the host OS, all application windows may be placed on the desktop. This can be done in a number ways. In one embodiment, the VEE desktop (except the windows of these applications) may be hidden. In another embodiment, each user application has a separate window on the host desktop. Also, the user application window may be displayed in the full screen mode or can have the reduced size.

The user application can also be shipped with drivers, services and other system service tools. Alternatively, the user application can configure other applications, devices, some operating system parameters, and so on. The relevant aspect is not what exactly the application function is, but which aspects of the second VEE are included in the application in order for it to perform its function. In any event, the invention can be also used for launching such applications.

When system elements are hidden during user application running they can be shown, for example, in a context menu of the application link in the first VEE.

Furthermore, if for example first VEE is Mac OS with its Dock Bar, the second VEE is MICROSOFT WINDOWS launched under VM control, and the Dock Bar shows all launched applications. The Mac OS shows a VM application icon in the Dock Bar. This icon has associated with this item a context menu. MICROSOFT WINDOWS has a "Start" menu, which can be shown as a submenu in Mac OS context menu. Also, other control items (Desktop, Control Panel, Task Bar, etc.) can be mapped in the same manner to this Mac OS context menu. Creating control item mapping of the second VEE to the first VEE is very helpful especially in the cases when non-native application is shown and other items are hidden. Without mapping, the user cannot easily manipulate the second VEE OS when it is running, which is used for non-native application launch. Due to second VEE control item mapping to the first VEE, it is possible to manipulate not only application launching, but all second VEE OS aspects.

Such integration can be extended by associated icons captured from second VEE. Also, keyboard mapping can be implemented in this manner, so that the user can have his choice of, for example, APPLE keys and their functions even when using MICROSOFT WINDOWS applications (or vice versa—using MICROSOFT WINDOWS key mapping when using an APPLE application.

One particular embodiment relates to integration of "widgets" (using APPLE Macintosh terminology or "gadgets" in WINDOWS VISTA terminology), provided by non-native or remote applications, into the host OS of a computer system. In the remainder of this discussion, the term "widget" will be used for both widgets and gadgets.

According to an exemplary embodiment, the non-native widgets or widget applications are virtualized on the user's computer system, so that the user can use these widgets as if he had a corresponding non-native OS installed on his computer or a web page downloaded to his computer.

Accordingly, a Virtual Execution Environment, such as a Virtual Machine (VM), is launched on a host OS of user's computer system. The VM runs a guest OS that, in turn, runs a widget application that is native to the guest OS and is non-native to the host OS of the user's computer system. For example, the MICROSOFT WINDOWS application (such as, for example, a calculator) is virtualized on Mac OS. A Virtual Machine (VM) running MICROSOFT WINDOWS as a guest OS is launched on APPLE computer and a MICROSOFT WINDOWS calculator widget appears on user's Mac OC X desktop screen.

The calculator icon can be also added to a Mac OS X desktop or to the dashboard (i.e., tool bar) instead. Then a user can click on the calculator icon on the Mac OS dashboard and MICROSOFT WINDOWS calculator widget will appear on the Mac desktop. The user can use the calculator as if he were using MICROSOFT WINDOWS on his computer for as long as the VM supporting execution of the widget application is activated on the user's computer system.

Figure 19:
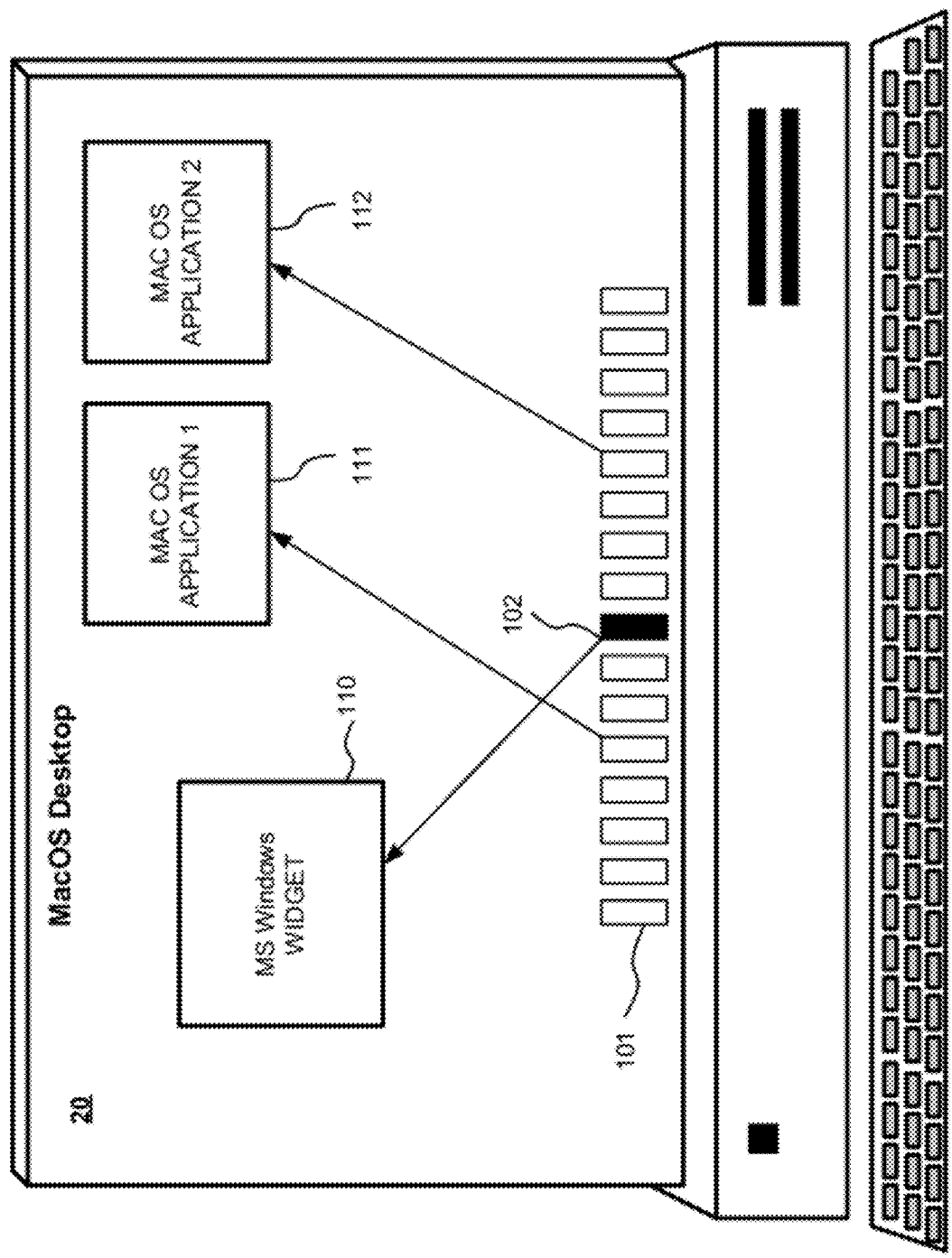
FIG. 19 illustrates an exemplary widget-related embodiment in the context of the APPLE Macintosh computer system.

With the WINDOWS OS running inside the VM, the various WINDOWS features (i.e., gadgets) can now be available on the Mac desktop as illustrated in FIG. 19. The APPLE computer system 20 has Mac OS X running on it. The desktop screen has a dock bar having icons 101 of various Mac OS X applications. When a user clicks on one of the icons 101 the window of the corresponding application, for example, Mac OS applications 111 or 112 appears on the desktop screen. A VM (not shown) running MICROSOFT WINDOWS OS is activated on the computer system 20 and a widget application 110 is running under MICROSOFT WINDOWS OS and an icon 102 is added to the dock bar. When a user clicks on the icon 102 a widget application appears on the desktop screen in the same manner as if it were a regular feature provided by Mac OS. Note that a window of MICROSOFT WINDOWS OS is masked out and does not appear on the screen and only the widget 110 is displayed.

Note that any number of widgets running on a single guest OS can be displayed on the screen of the host OS. Alternatively a number of the VMs can be activated on the host OS. In this case, each of the VMs can provide a set of widgets supported by their corresponding guest OSs. For example, a single VM can support a single widget, or several widgets can be associated with a single VM, and one widget with a different VM, or multiple widgets can be supported by each of the VMs.

Alternatively, a VM can be activated on the Host OS, and the Guest API supporting objects from the remote system can be executed on the VM. A Host API supporting objects of the local system runs on the Host OS. A conversion API that converts objects supported by the Guest API into objects supported by a Host API also runs on the VM. For example, an API that supports the gadgets of the Mac OS X dashboard serves as a Host API and the API supporting WINDOWS VISTA gadgets located on the VISTA sidebar can be implemented as a Guest API running on the VM. The conversion API converts the WINDOWS VISTA gadgets into widget-like objects supported by Mac OS X dashboard API. Thus, no Guest OS needs to be installed on the VM. The VM can simply run the Guest API and the conversion API and interact with the Host OS using a Virtual Machine Monitor (VMM) and/or a Hypervisor. According to an exemplary embodiment, a MAC OS X user can request any of the WINDOWS VISTA sidebar gadgets and have them added to his MAC OS X dashboard.

In one embodiment the mini-icons from MICROSOFT WINDOWS system tray (such as, for example, the MICROSOFT OUTLOOK envelope (notification of receipt of email), Norton protection center anti-virus check indicator, SKYPE mini-icons (e.g., on/invisible/off, missed calls), YAHOO IM mail notification, and other animated and non-animated icons/graphical objects located on the right and on the left of the WINDOWS bottom tool bar, system tray, task bar, Quick Launch area, etc.), temporary pop up notification windows (e.g., SKYPE contact signing in, YAHOO IM contact status, etc.) can be virtualized as well, and displayed in the host desktop (e.g., as part of the APPLE Dock Bar, the APPLE Menu bar, the APPLE Status Bar, or on the Dashboard, or separately displayed in a predetermined area of the screen, e.g., at bottom left or bottom right, same as they would be in Windows). Strictly speaking, such graphical objects (which are more akin to small animated icons) are not widgets (or, at least, not full-blown widgets), although the approach to virtualizing them is similar to that of virtualizing fully functional widgets. Essentially, any object or icon used by the non-native application for notifications or status information, regardless of where on the screen it appears, can be virtualized in this manner.

In this case the VM also runs MICROSOFT WINDOWS OS and the gadgets/widgets/graphical objects are created on the WINDOWS desktop screen, with corresponding icons in the Vista Sidebar area (if the OS is Vista). The same can be done for other OSs, such as, for example, Mac OS X. In this case the icons from the dock bar can be virtualized by launching a VM that runs Mac OS X as a guest OS. Then, the widgets corresponding to the icons can be displayed on the Mac OS X desktop screen or Dashboard, or, if the host OS is WINDOWS, icons and graphical objects normally displayed on the Mac OS Dock Bar can be displayed in the WINDOWS task bar, or in the Vista Sidebar. Also, graphical animations associated with standard OS events (such as window minimization in Mac OS X) can be virtualized to be applicable to non-native windows as well.

In another embodiment, a widget can be a part of the web application that is loaded onto the VM running the guest OS that is activated on user's computer system running the host OS. For example, a widget of a downloaded applet of a clock displaying the time in a particular part of the world can be placed on the user's desktop screen, and the user can see the clock without having to log onto the web site where the clock widget is implemented. Instead, all the user has to do is click on a button (or an icon) of the tool bar that activates the VM. As yet further embodiments, a local or remote application can be the source of information displayed in the widget. For example, the information displayed in the widget can come from a local non-native application that otherwise displays a full screen (or at least occupies a significant portion of the screen), but the user has chosen to define only a small portion of the entire application window as the widget. Similarly, a remotely running non-native application (e.g., on a server or another computer) can provide data to the widget (such as stock price quotes), and the widget can display the data, even though the interface to the remote application requires a non-native local client-side code.

Figure 20:
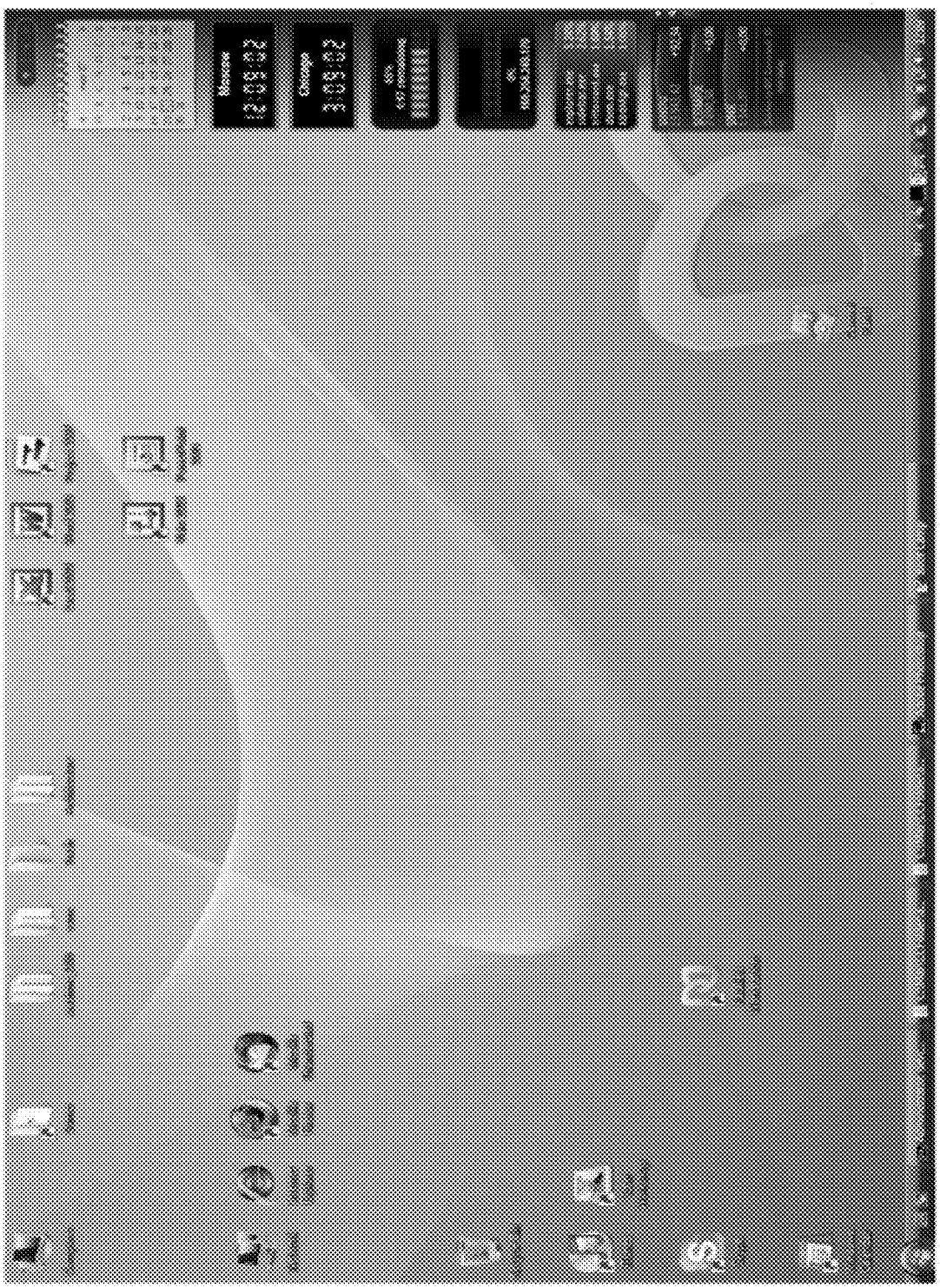
FIGS. 20-21 illustrate screen shots of exemplary widget-related embodiments in the context of the MICROSOFT WINDOWS VISTA desktop.
Figure 21:
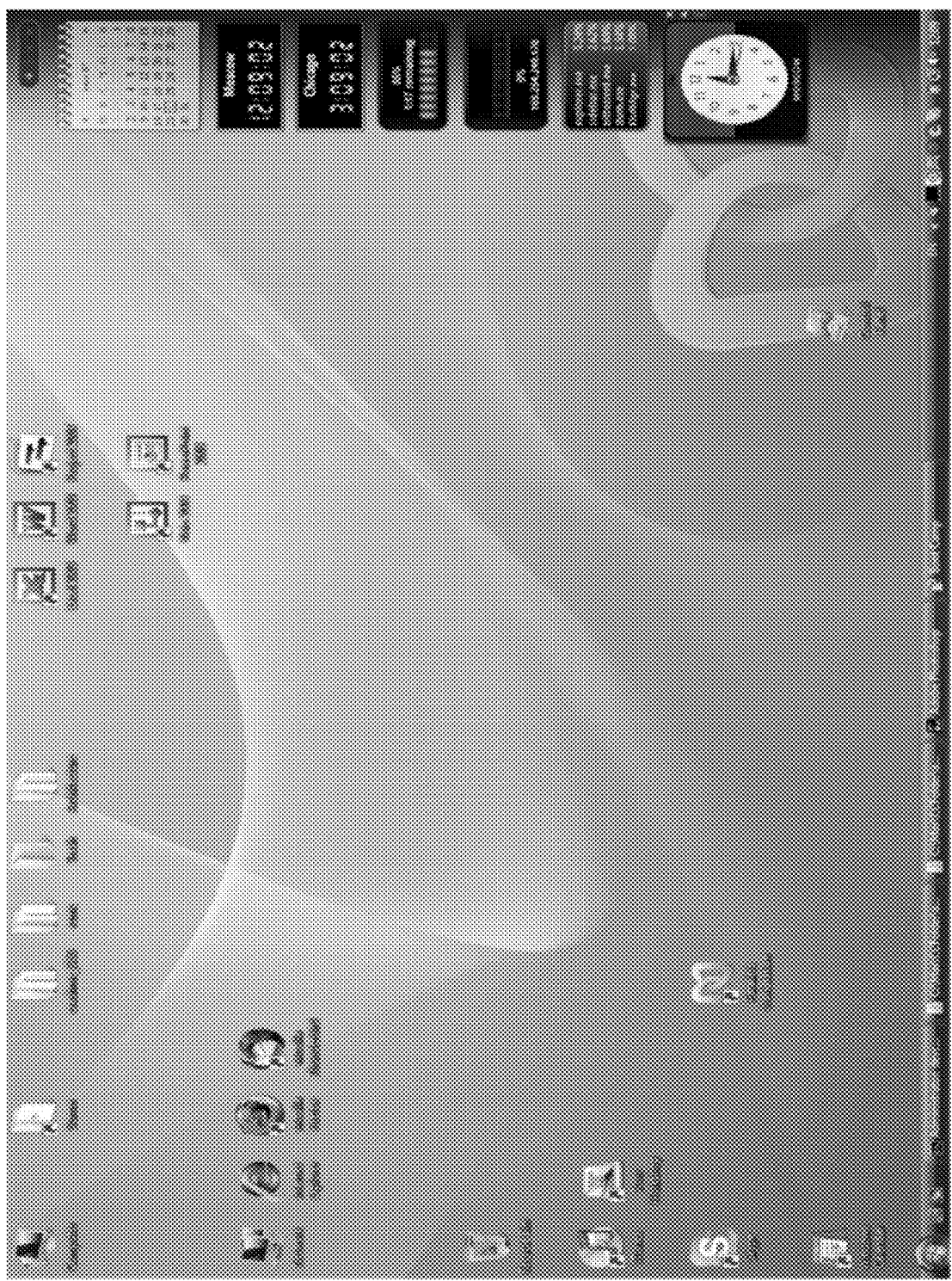

An exemplary screen shot displaying some web widgets is shown in FIG. 20. The widgets are displayed on the right of the MICROSOFT WINDOWS VISTA screen. These widgets appear when the VM running on MICROSOFT WINDOWS VISTA is activated. In FIG. 21, an additional widget (a round clock showing time in Moscow in the bottom right corner of the screen) appears after a user has clicked on a corresponding icon from the tool bar.

Figure 22:
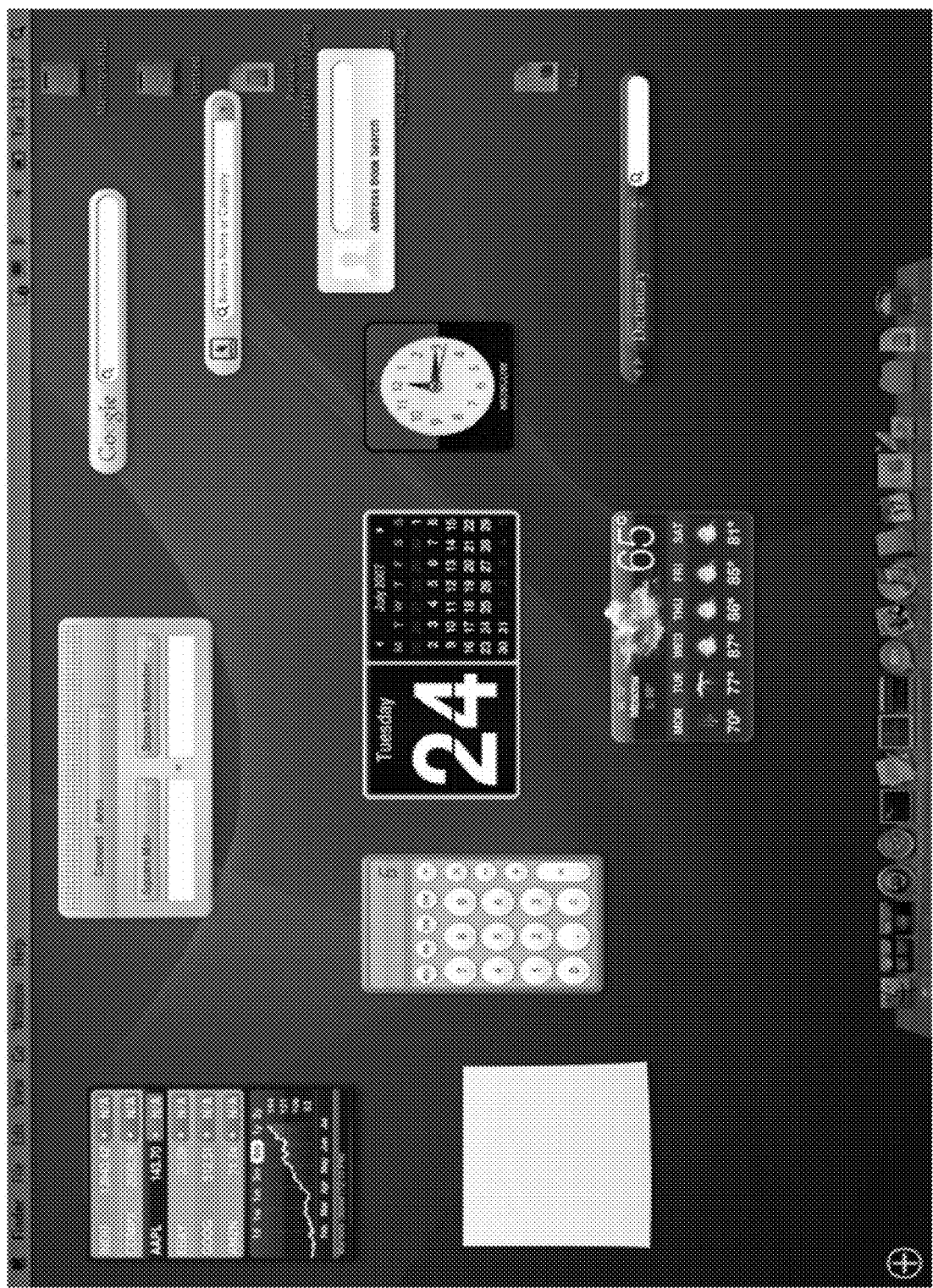
FIGS. 22-23 illustrate screen shots of exemplary widget-related embodiments in the context of the APPLE Mac OS X dashboard.
Figure 23:
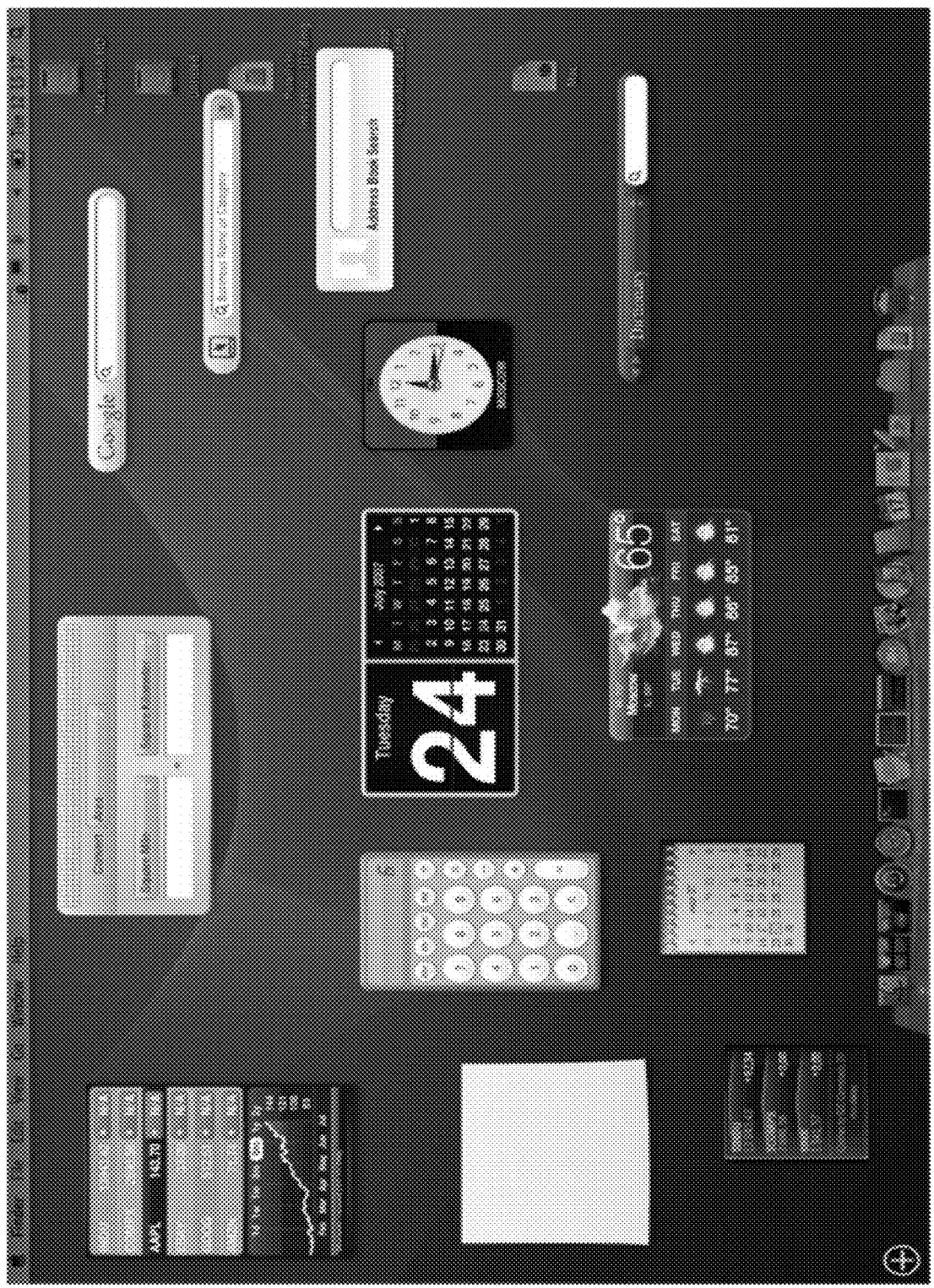

FIG. 22 shows an exemplary screen shot displaying several web widgets on Mac OS screen. These widgets are displayed when a VM on the MAC OS is activated. Some additional widgets (see calendar and stock quotes table displayed at the bottom left of the screen) are shown in FIG. 23. These widgets have appeared on the screen after the user had clicked on the corresponding icons from the service tray at the bottom of the desktop screen.

The web widgets are displayed in such a way that other portions of the web applet are masked out. Alternatively the widgets can also have a different shape determined by the use of special skins. As one option, all widgets can appear on the screen when the button activating the VM is clicked. By clicking on that button, the user can directly launch the Virtual Machine and a particular non-native widget application or a set of widgets running within the Virtual Machine can be presented to the user on the desktop screen.

This is particularly advantageous for those users who do not wish to concern themselves with the exact mechanics of how the Virtual Machine, and the widget applications launched within that Virtual Machine, interact with the host OS, but only wish to see the final result—an integration of widgets into their desktops and operating systems.

As a further option, there can be separate icons or buttons on the desktop specifically for launching a particular non-native widget. In this case a user has to activate a VM, or a number of VMs, first by clicking on a special icon on his desktop screen. Then, a set of icons corresponding to the widgets can be displayed on the desktop screen or simply added to a tool bar provided by the user's operating system. The user can invoke each widget individually by clicking on the widget icon.

Furthermore, each non-native widget application can use one icon application, or a single icon can be used to designate all applications running from a particular VM, or, alternatively, one icon can be used to designate all non-native widgets that are currently running.

It should also be noted that although the discussion herein has been to some degree in terms of integrating WINDOWS widget applications into the APPLE Macintosh platform, the invention is not limited to this example. For example, WINDOWS widget application can be integrated in this manner into a LINUX environment. Similarly, widgets from several different operating systems can be integrated into a single desktop—in other words, one VM within the APPLE host OS, can be running a guest WINDOWS OS, and one or more WINDOWS widget applications, a second VM can be running LINUX, and one or more LINUX widget applications, a third VM can be running SOLARIS and one or more SOLARIS widget applications, etc.

However, as far as the user of a computer system is concerned, he is presented an APPLE Macintosh desktop, with all the widgets graphically integrated into the Macintosh desktop screen.

Furthermore, in one embodiment of the invention, the widgets can be independent of each other—i.e., not all widgets need to be "on top" simultaneously. This is to be contrasted with the convention art, where the user, by toggling a hot key, can "bring up" all the widgets, or hide all the widgets, but this operation must be conducted on all the widgets, or not at all. Here, each widget can be individually activated by the user to be placed "on top" of the display.

Additionally, the various "system areas" can be virtualized in the same manner. For example, the Quick Launch area, the task bar, the system tray, etc. can be "defined" or "clipped" from the guest desktop as a separate window, or a portal into that VM, and placed into the non-native desktop. Thus, if the host operating system is the APPLE OS, in addition to the Dock Bar, the additional system areas and active elements relating to non-native applications and non-native operating systems can be added. Also, the user has an option to place them either in the "familiar" locations, where Windows would place them (for example, lower left in the case of the Quick Launch area, and lower right, in the case of a system tray), or the user can place them elsewhere on the screen, as desired. Also, such "defined windows" (or "cutouts", or "clips") can be used as a portal into a virtual machine.

Additionally, it will be appreciated that the various graphical elements of other operating systems, such as the APPLE operating system, can be placed into Windows, if Windows is the host operating system. For instance, the APPLE Dock Bar can be located on the bottom of the screen, and function identically as it would on the APPLE machine, even though the host operating system is Windows.

One fact of life of many system administrators work environment is they need to monitor many applications and virtual machines, such as servers, on the same desktop. This causes a problem in that the desktop "real estate" is relatively finite, when placing too many VM windows, each of which corresponds to a virtual machine. This makes the desktop look very cluttered and difficult to work with. Another fact of life is that many of these virtual machine windows, particularly if one corresponds to a server, have nothing happening in them most of the time—in other words, a normally functioning server, which is the case for the absolute majority of the time, does not require significant intervention or actions by the system administrator.

Another situation where there is no need to virtualize the entire application window is in the case of applications that generate notification signals for the user (and for the operating system). For example, in the case of YAHOO Instant Messenger or SKYPE, there is a window for the main application, and also there is a separate chat window. Often, there is nothing happening in the main window, and frequently not much happening in the chat window as well.

The present invention, in one aspect, provides the possibility for displaying only the active window (in this example, the chat or phone window of YAHOO IM or SKYPE), but not displaying the main application window. Additionally, the present invention provides for completely hiding even the chat window, until "something happens" in the chat window—in other words, whoever the user is chatting with actually writes a message. In that case, the application (in this case, the non-native application, such as SKYPE or YAHOO Instant Messenger) generates a notification—in other words, the application requests something from the system, in this case, the "something" is a request to display a notification on the screen. This system call is intercepted, and is dealt by the virtualization environment. This approach has the advantage that the user of the computer can have multiple chat windows (in this example) and other applications that nominally require user interaction, but, as a practical matter, the user often leaves unattended. With the approach described above, these non-native applications, while running in the background, take up no desktop real estate, and "pop-up" only when something actually happens in those windows. The windows are maintained by their corresponding virtual machines, but are not actually displayed on the desktop, except possibly in minimized form (or super-minimized form, to be discussed below).

As yet a further option, the virtualized windows can have dynamic resolution, and be scalable in X and Y directions. Also, the scalability can be different in the X and the Y dimension. In other words, from the perspective of the virtual machine that maintains a particular application window, the resolution of that window can be any arbitrary resolution, from supported modes (for example, 1280×800, or 1900× 1200, etc.) to any custom mode, including those that are not supported by the physical hardware. This can also include resolutions that are clearly beyond the capability of any current hardware, for example, 1,000,000 by 1,000,000 pixels.

The virtual machine that maintains the window, instead of "talking" to a real graphics adapter, in fact talks to a virtual adapter. As will be appreciated, each virtual machine, in effect, has its own virtualized video card/adapter. The host operating system and its graphics routines are responsible for the actual rendering of the virtualized window with dynamic resolution. When the window is actually rendered, it is treated the same way that an image is treated, in the sense that an image (like a jpeg image) can be stretched either in both X and Y directions, or only in the X direction, or only in the Y direction.

Also, the scale of the image that is displayed in that case changes. Similarly, in this case, the scale of the displayed virtualized application window changes. For example, the entire desktop, when virtualized, can take up the whole screen, or only a portion of the screen. However, the image of the desktop can be shrunk, or scaled, to be smaller than the desktop (or, alternatively, be made larger than the desktop). In that case, all of the displayed elements in that scaled virtualized application window also expand or shrink accordingly (i.e., the icons expand or shrink, the active elements, such as buttons or taskbar or system tray, etc., also expand or shrink, and so on).

As a further option, all or some virtualized windows can have multiple states of display with dynamic resolution. For example, one state can be a minimized state, where the window is reduced to a small icon. A super-minimized state may be a very small icon (e.g., the size of the "envelope" notification in OUTLOOK), whose only purpose is to blink, or flash, or change color, or otherwise indicate that the user needs to click on it to see the nature of the notification.

An intermediate state can be a larger size, which is big enough for the user to see what is going on inside that window, but still smaller than "real" or "natural" size. A third display mode is where the window is in its "natural size", in other words, the way the non-native application that maintains that window expects for that window to be displayed. Yet another possible mode is where the window is actually stretched larger than the "natural size", above—in other words, if the virtualized application maintaining that window expects it to be, for example, 300×300 pixels, the user can actually stretch it to be larger than that (and, correspondingly, all the items inside that window stretch as well).

As yet a further option, the user can define a particular area inside that non-native application window, and display only that portion, while masking out the rest of the window. That defined and displayed portion can be, as described above, i.e., having various display states, and various dynamic resolutions.

As yet a further option, a window which is minimized or super-minimized on the display (note that the application that maintains the window and the guest operating system for that non-native application are not aware that the window is actually minimized), but when the user brings the mouse cursor over the window, the window first expands to some intermediate state, which, for example, is large enough to show the user what is going on in the window, but relatively small enough that it doesn't take up too much of the display. If the user holds the mouse cursor long enough on the window, it expands to its "natural size."

As yet a further option, additional graphical control/active elements can be added to the window (i.e., for example, in the top right corner—in other words, in addition to the standard minus, square, X at the top right of each window it is possible to add one or two additional elements, for example, for display in the intermediate size state, or several such icons, if there are several such intermediate states, and/or a state larger than the "natural size" state. Note that regardless of how these virtualized windows are scaled, they are fully functional windows—in other words, all of their graphical elements and active elements, such as hyperlinks, clickable area, icons, etc., all function in exactly the same manner as they would if the window were at "natural size."

As yet a further option, this approach can be applied to various "cutouts" or defined windows. For example, the system tray can be virtualized in this matter, but then scaled to a smaller size, and placed on the APPLE desktop. Similarly, the Mac OS Dock Bar can be placed on the windows desktop, but scales to a different size, other than 100% size. All of the functionality, nonetheless, remains the same.

As yet a further option, the icons in the windows of the virtualized applications can be displayed separately from the windows themselves. For example, on the windows desktop, there are a number of icons that are typically displayed. Using the approach described herein, it is possible to define these icons as the windows, display them on the APPLE desktop, but in addition to their full functionality, their size can be made smaller. For example, as a practical matter, given that the amount of desktop real estate is limited, there is only a finite number of "full size" icons that can be effectively displayed on the screen. However, a user can "shrink" the non-native icons, and thereby have many more icons than he otherwise would, on his desktop.

As yet a further option, the icons in the virtualized windows can be click-through, or can be active. In other words, the user can define whether, in a display non-native application window, the icons respond "as usual" when they're clicked on, or whether the click actually goes to the native application or desktop that is "underneath" the virtualized window. Similarly, the user can if, if he chooses, maintain the Z order of individual applications in a single virtual machine, or he can uncouple them from each other—in other words, the Z order of each non-native application, even if they belong to the same virtual machine, is defined not by the guest operating system of that virtual machine, but by the host OS.

Note that the resolution and size of individual windows can be scaled independently of each other. Also, even windows that correspond to non-native applications for the same virtual machine can be scaled and have dynamic resolution change independently of each other. Note also that the dynamic resolution can change continuously while the user "drags" the corner of the window to change its size. Also, this is applicable not only to rectangular windows, but also to windows of arbitrary shape, non-rectangular shapes, irregular shape, circular, windows with rounded corners, etc.

Also, various hotkeys can be defined for the particular properties. For example, a hotkey can be defined to "snap" the scaling of all the virtualized windows back to their "natural size." (Similarly, a hotkey can be defined to reverse the operation).

Hotkeys can also be defined for the click through feature, as discussed above. Also, hotkeys can be defined for the transparency (i.e., with a single hotkey, all the displayed virtualized windows can be made, for example, 50% transparent, or 80% transparent, etc.). Also, a user can define a property of a window such that when a notification of some event takes place (for example, a chat window, previously dormant, comes alive because the person the user was chatting with on the other end just sent something), that event can trigger a change in properties of that virtualized window. In this case, where the window was partly transparent, now it becomes non-transparent (i.e., 100% active and visible), other options are possible, for example, in this scenario, the window can go from, for example, some low value of transparency (e.g., 20%, 30%, etc.), to a higher value of transparency (e.g., 60% or 70%).

If the virtualized window is stretched/scaled to a size bigger than the size of the desktop, scroll bars will appear.

Note that different virtual machines need not have the same resolution, including the possibility of all of the virtual machines having their own individually-defined custom resolutions, each of which can be adjusted dynamically, if necessary, for purposes of rendering the relevant windows on the display.

Also, a separate area on the desktop can be defined for all the guest/virtualized windows, in minimized form or in super-minimized form (for example, similar to the task bar in windows, but not limited to the same size as the windows task bar. Similarly, the minimized icons or super-minimized windows can be arranged into a separate ribbon.

For example, some of the relevant icons can be made much smaller, and automatically "pop-up" when some event inside the window takes place (for example, a notification regarding a received message is triggered in that window, etc.). Another example where this can be used is for email notifications, such as in OUTLOOK, where an active area briefly pops up on the screen to notify the user of the received email. Using the technology described herein, the user can change the size of the notification pop-up (something which is impossible to do in OUTLOOK), for example, by making it smaller—since many users do not need to see the entire popped up display, but only a portion of it.

As yet another option, if one of the windows is, for example, a guest desktop window, with multiple application windows inside it, when the guest desktop window is stretched or scaled, all of the windows inside the guest desktop windows are stretched proportionately, while retaining their functionality.

Note also that unlike conventional art, for example, the "AERO" feature in Vista, where the window pops up in reduced size while the user is holding a cursor over an object on the screen, the scaled/stretched size of the window is a permanent feature—in other words, this is how the window at issue is displayed, unless the user changes the properties of that window.

The actual contents of the window is maintained in a buffer. Note that any window can be virtualized in this manner, and stretched or scaled in this manner, including native windows.

Although in the discussion above, a Virtual Machine (VM) was used as an example of how the non-native widget application can be launched within an isolated execution environment, it should be remembered that VM is only one example of such an environment. Other Virtual Execution Environments can also be used, for example, Virtual Private Servers, such as those available from SWsoft, Inc.

Also note that the exemplary embodiments are not limited to any particular type of a VM. For example, conventional Virtual Machines can be used, Hypervisor-based Virtual Machines can be used, Lightweight Hypervisor-based Virtual Machines can also be used, VMM-based VMs, hypervisor-based VM with and without hardware virtualization support, with or without security support (e.g., using Intel Lagrande technology, VM/lightweight VMM/AMD secure execution support/etc.), as well as different VPS/VE such as VIRTUOZZO from SWsoft, Inc., XEN paravirtualization, SUN MICROSYSTEMS container-based environments, HPUX internal container environments, jail-based environments, terminal sessions of MICROSOFT WINDOWS Terminal Server and/or CITRIX Presentation Server or similar.

It should be noted that the approach described herein is applicable not only to different host/guest OS's, but also to the situation where the guest OS is the same as the host OS (e.g., a MICROSOFT WINDOWS host desktop and a MICROSOFT WINDOWS VM). In this case the native widgets are virtualized. Also, a VM can be launched within another VM ("nested VMs"). Note also that the VM can be started from scratch, or can be started from a snapshot, or some pre-defined checkpointed VM context.

Figure 24:
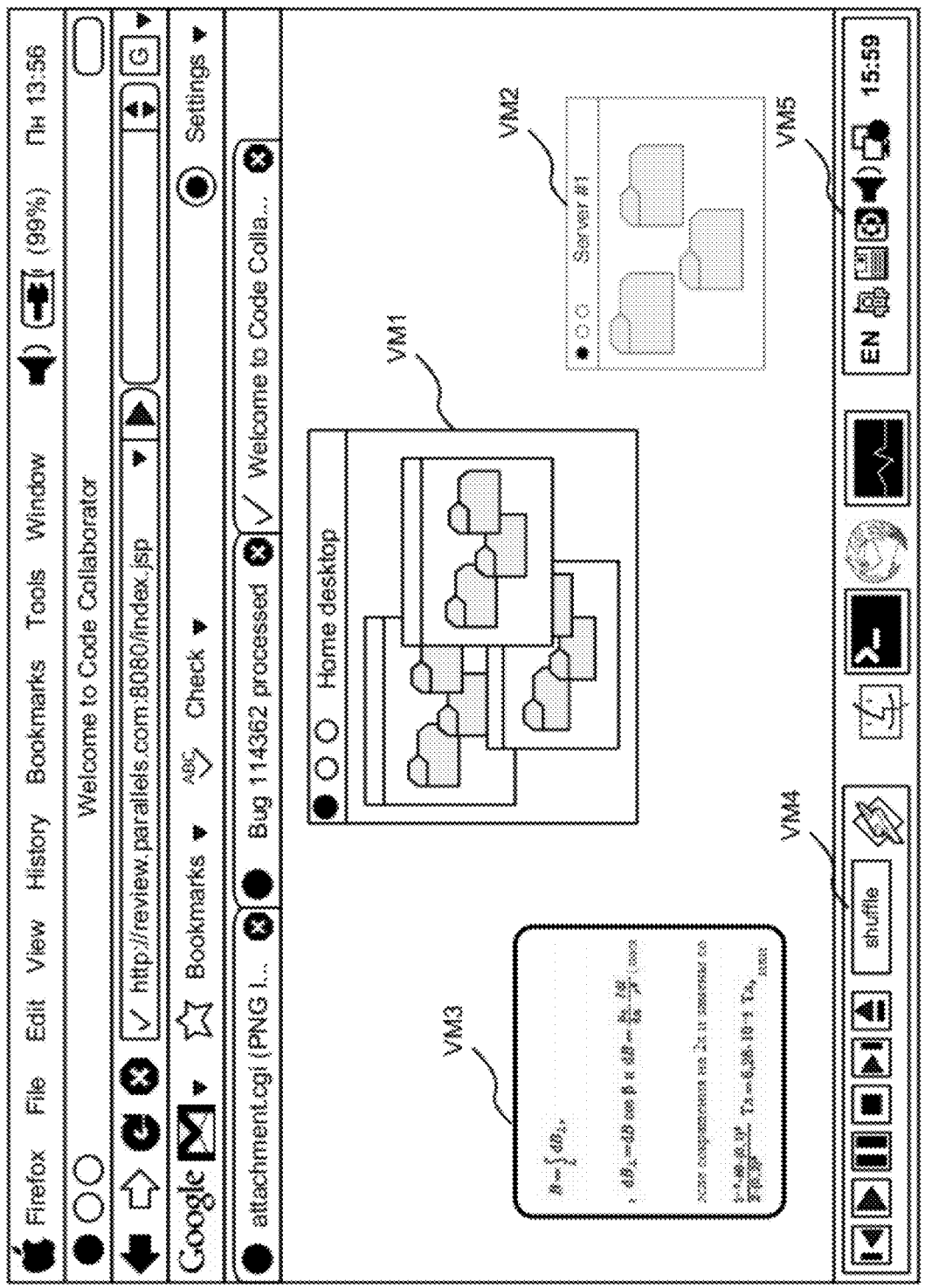
FIG. 24 illustrates an example of a screen that displays five Virtual Machines.

FIGS. 24-33 illustrate the various concepts described above. Specifically, FIG. 24 illustrates an example of a screen that displays five Virtual Machines. Virtual Machine 1 is an example of the display of the entire desktop. Virtual Machine 2 illustrates a single application that runs in a Virtual Machine, and also is an example of a partially transparent window. Virtual Machine 3 is an example of a portal—only a portion of the Virtual Machine 3 desktop is displayed (and, in fact, only a portion of the application window that has been "clipped", is displayed). Virtual Machine 4 and Virtual Machine 5 are also examples of portals—in this case, Virtual Machine 4 is an example of WinAmp application, which is an MP3 player for Windows, and Virtual Machine 5 is an example of virtualization of the system trade area.

Figure 25:
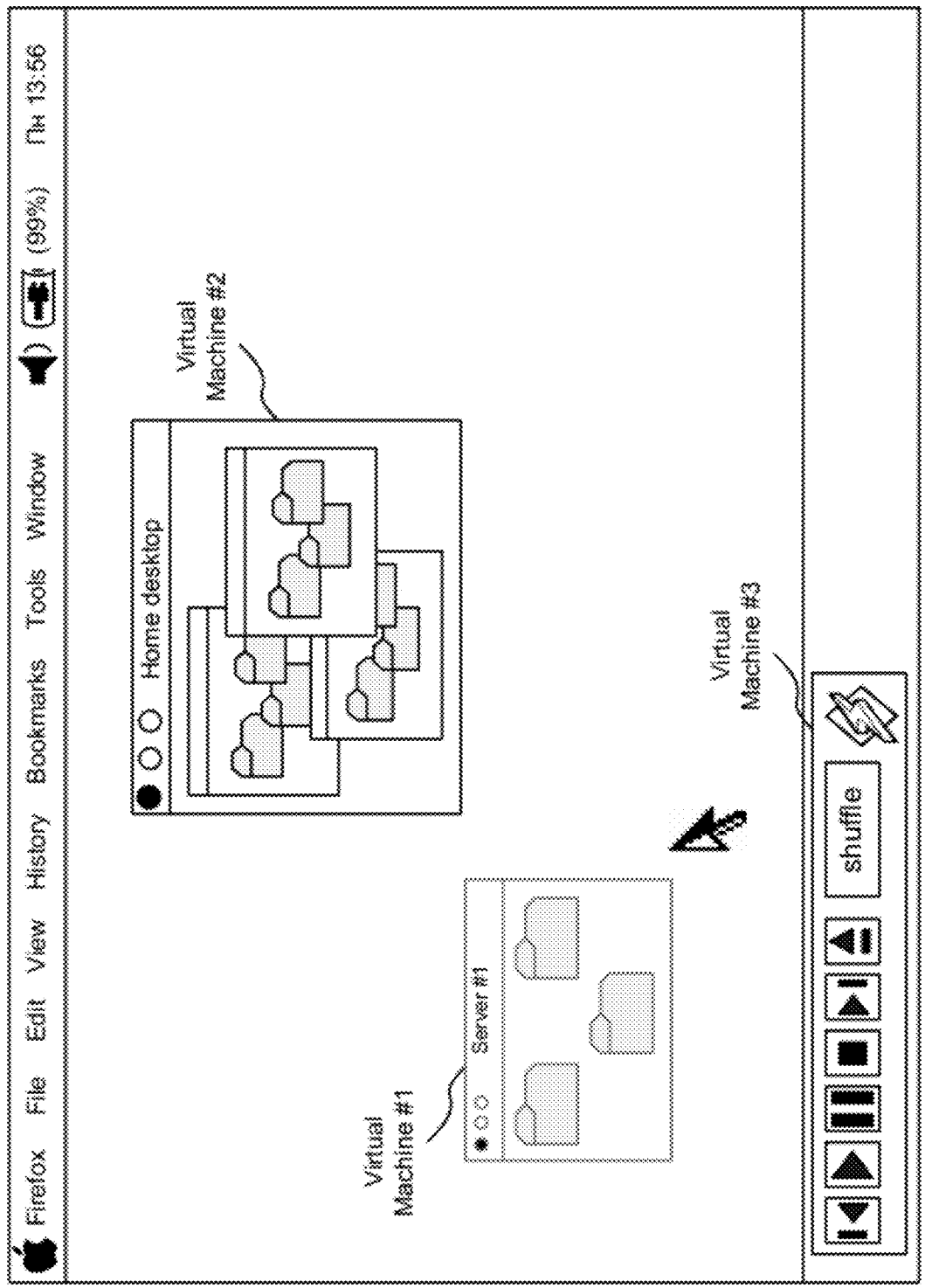
FIGS. 25 and 26 are illustrations of the scaling of a Virtual Machine window.
Figure 26:
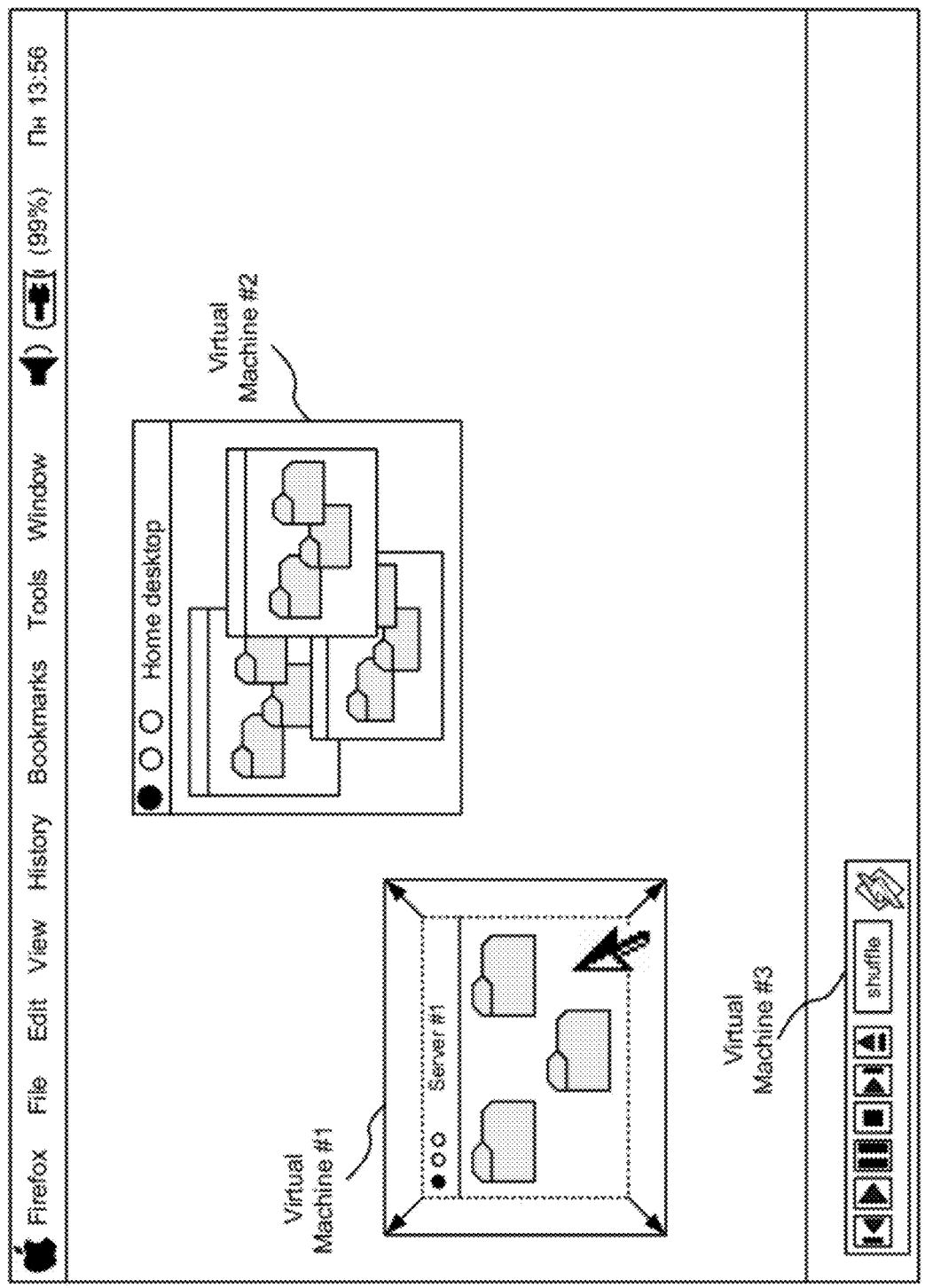

FIGS. 25 and 26 are illustrations of the scaling of a Virtual Machine window. In FIG. 25, Virtual Machine 1 window is shown in its natural size, and in FIG. 26 the user changes, or scales, the dimensions of that same window. Also, in FIG. 26, the Virtual Machine 3 has been scaled down in size (compare it to the size of Virtual Machine 3 window in FIG. 25).

Figure 27:
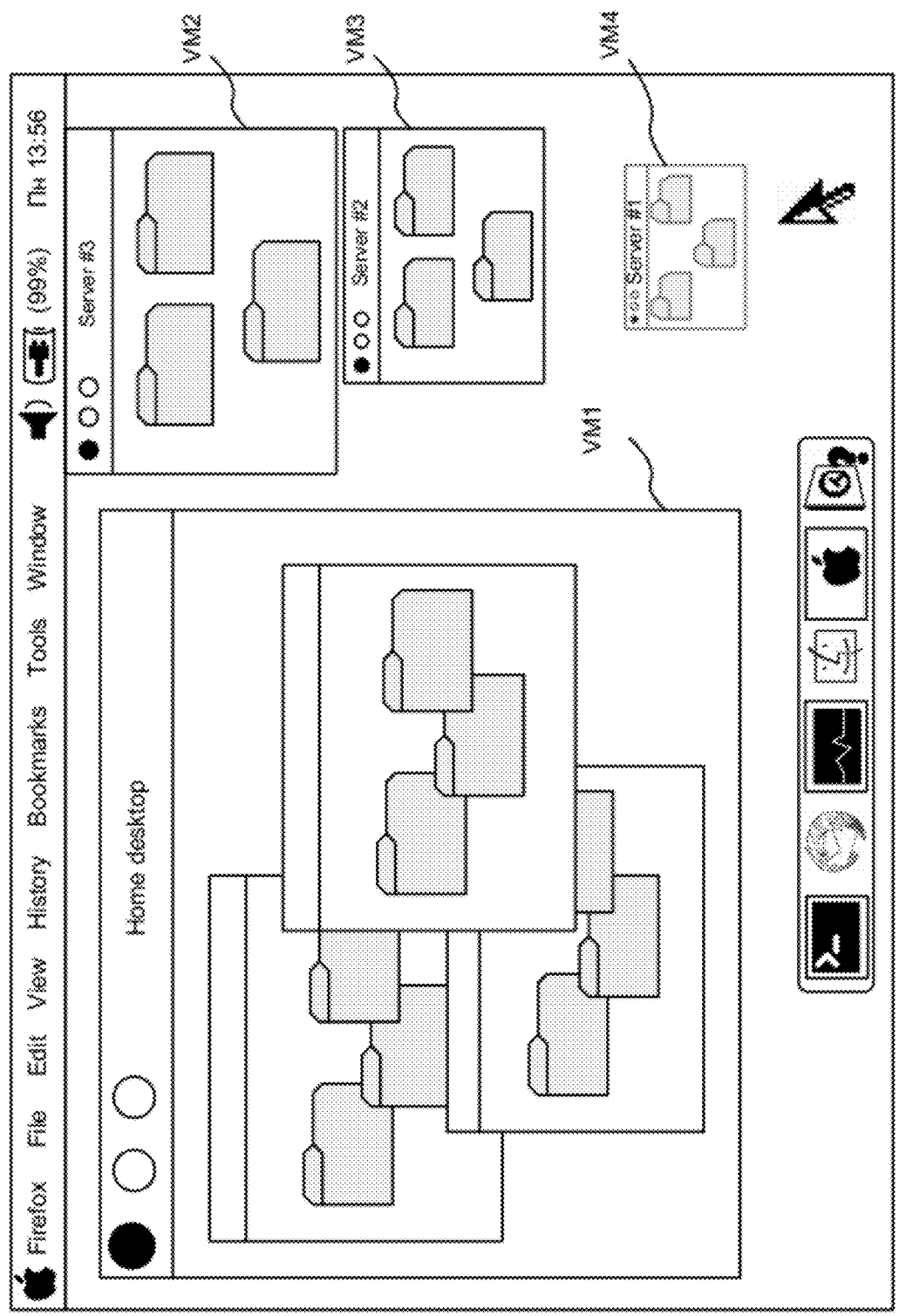
FIG. 27 is another illustration of the scaling of the Virtual Machine windows.

FIG. 27 is another illustration of the scaling of the Virtual Machine windows. Compare the size of the VM1 window in FIG. 27 and FIG. 24. Note that all of the objects inside VM1 window in FIG. 27 have been expanded in size, compared to FIG. 24. Also, the free server portals, VM2, VM3 and VM4, are all shown in different sizes, including different sizes for the objects inside of the windows.

Figure 28:
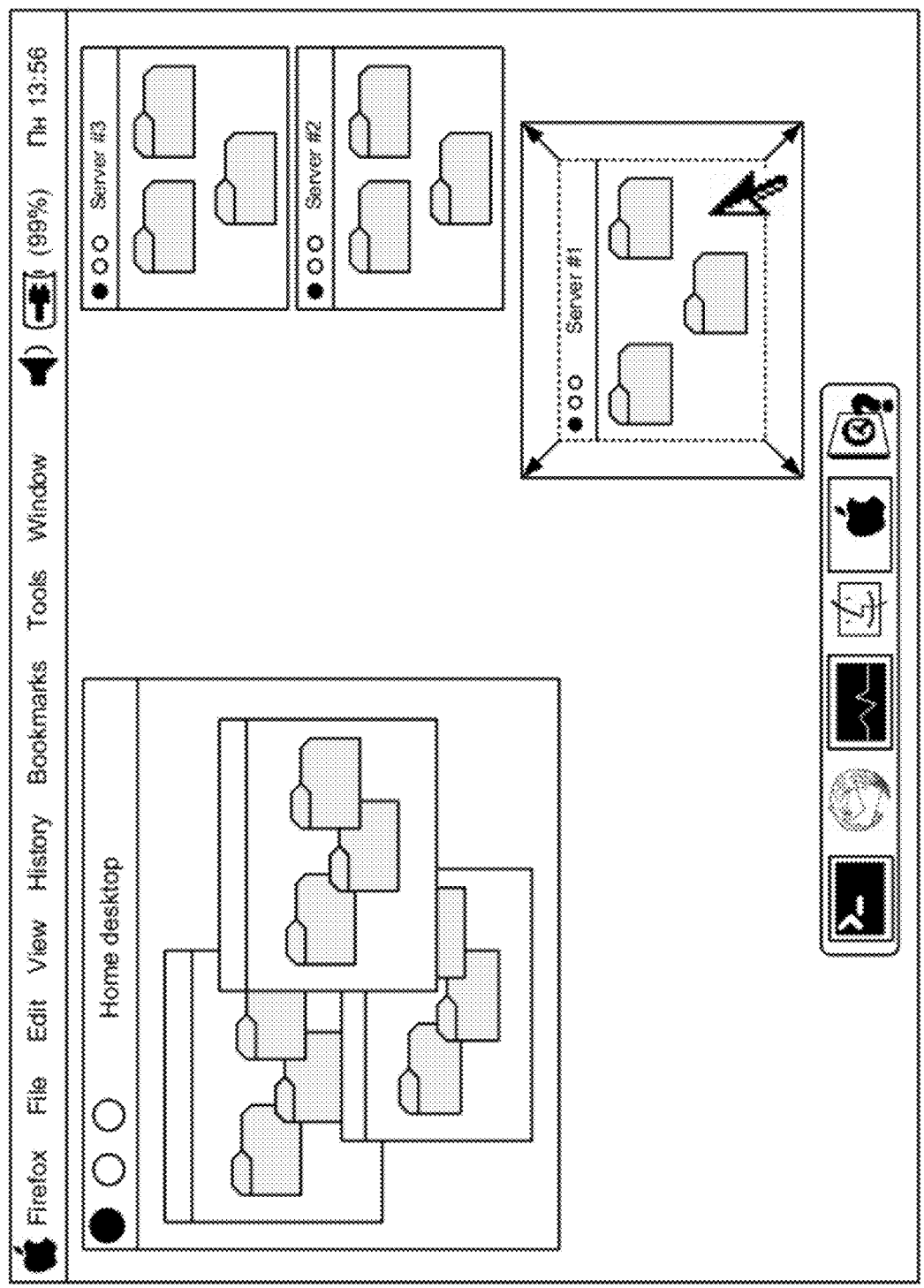
FIG. 28 is another illustration of how the user can scale a virtualized window.

FIG. 28 is another illustration of how the user can take the window designated VM4 in FIG. 27, and stretch, or scale that window.

Figure 29:
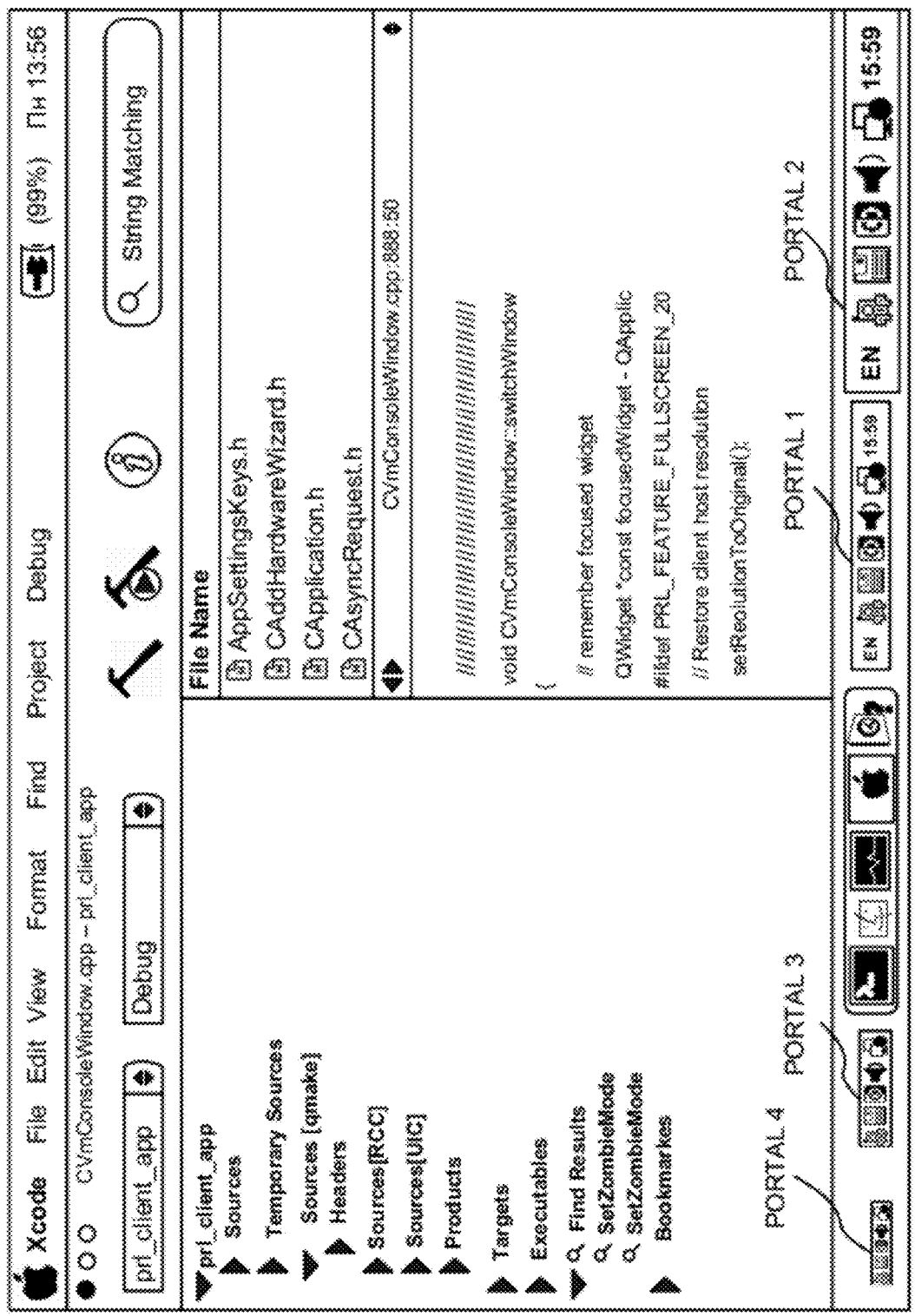
FIG. 29 is another example of how the portals can be scaled.

FIG. 29 is another example of how the portals can be scaled. Here, portal 1 is a "natural size" window that shows the system tray (i.e., at 100% scale). Portal 2 is a different Virtual Machine, where the window had been scaled to be larger, and the icons in the system tray of portal 2 have been scaled larger. Portal 3 is different Virtual Machine, which has been scaled smaller, and not all of the icons in the system tray are shown there (for example, the time is not displayed in portal 3). Portal 4 is similar to portal 3, but "shrunken" or "scaled down", to an even smaller size. For example, the user might want to do that if all he cares about is the presence of some notifications in such a system tray—in that case, even a very small icon, for example, an icon that blinks, or an icon that changes color, is sufficient.

Figure 30:
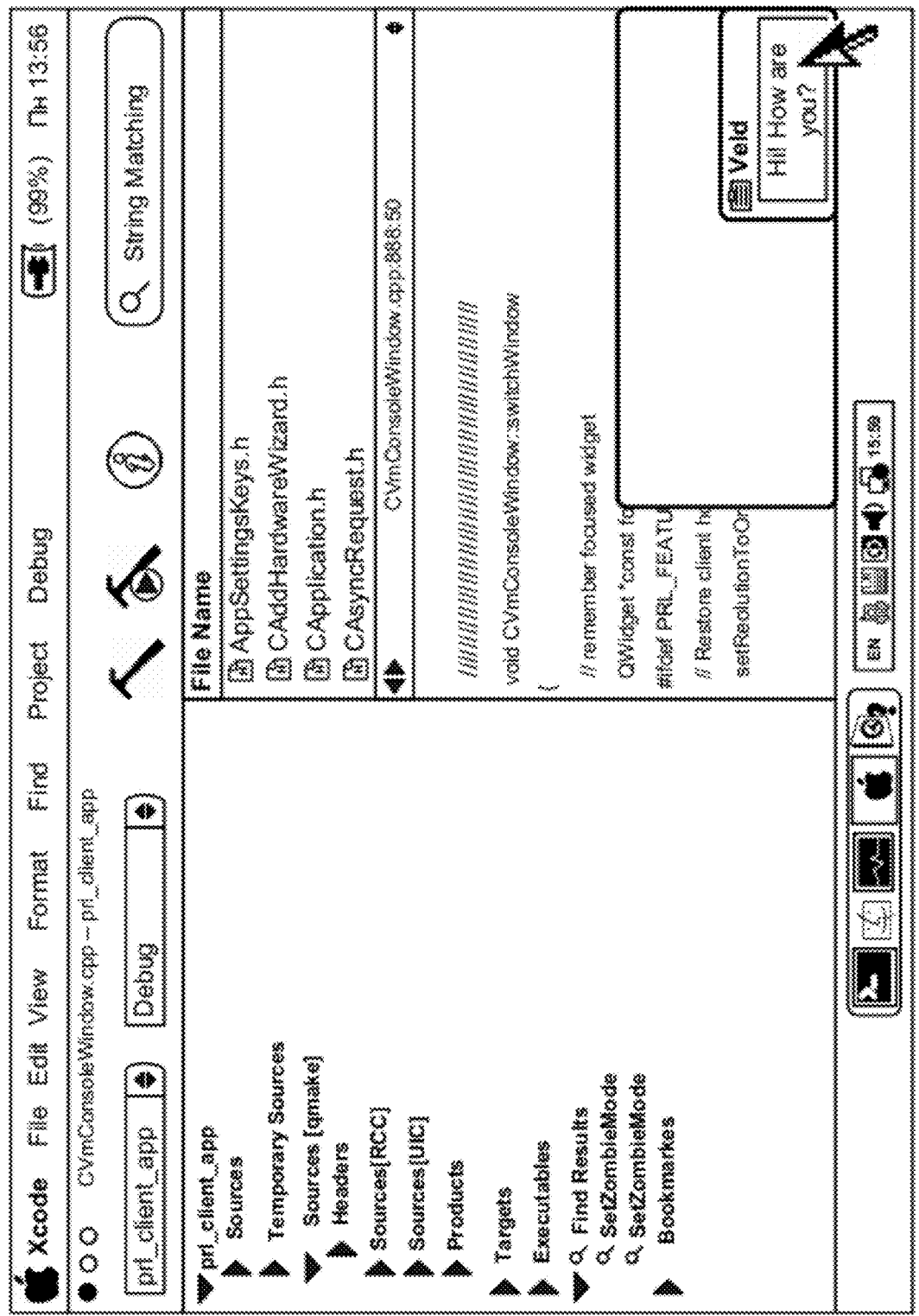
FIG. 30 is an example of how when a user brings a cursor to a minimized window, in this case, the chat window, the rest of the chat window expands to natural size.

FIG. 30 is an example of how when a user brings a cursor to a minimized window, in this case, the chat window, the rest of the chat window expands to natural size.

Figure 31:
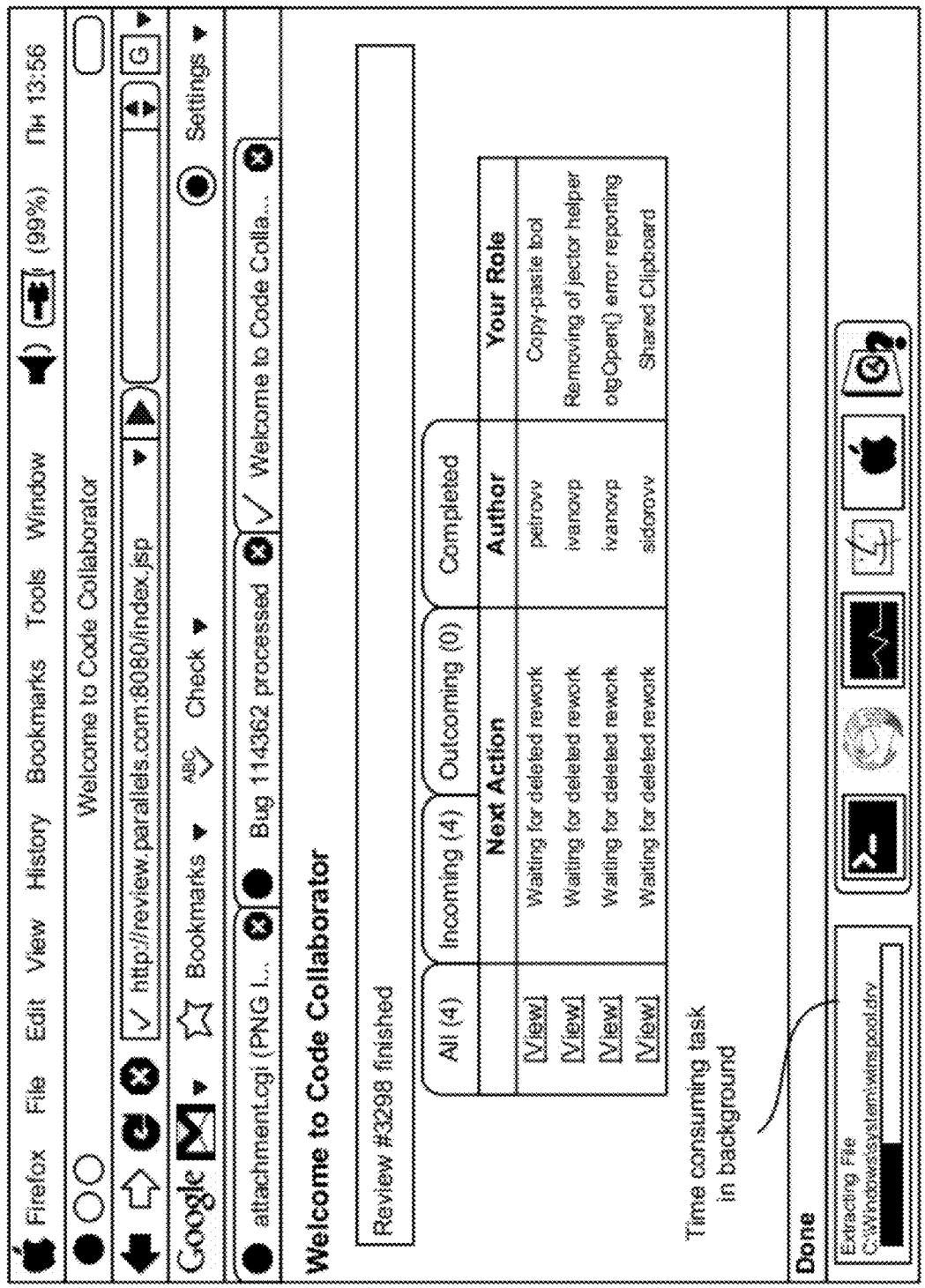
FIG. 31 is an example of how the user can define a portal into a Virtual Machine that performs some long running process, for example, unpacking a file.

FIG. 31 is an example of how the user can define a portal into a Virtual Machine that performs some long running process, for example, unpacking a file. See example in lower left of FIG. 31. In this case, the process can be fairly time consuming, and all the user cares about is not the entire display associated with the process, but only a small area that shows the progress of the action.

FIG. 32 is another example of two portals, portal 1, which is at 100% scale and portal 2, which is at roughly 50% scale (compare portal 2 in FIG. 32 with VM3 window in FIG. 24). As will be appreciated, whether the user can work with windows that have been scaled to whatever small sizes are possible, are up to the user—some applications obviously will be very difficult to work with in reduced size, such as text processing applications. Other applications may not require 100% of the size, and can be useful even in substantially reduced size.

FIG. 33 is another illustration of two portals, portal 1 which is natural size, and portal 2, which is also natural size, but is an example of a window that "pops up" in response to some event that occurred in the Virtual Machine (where the rest of the Virtual Machine, at this point, is not displayed on the screen at all).

Figure 8:
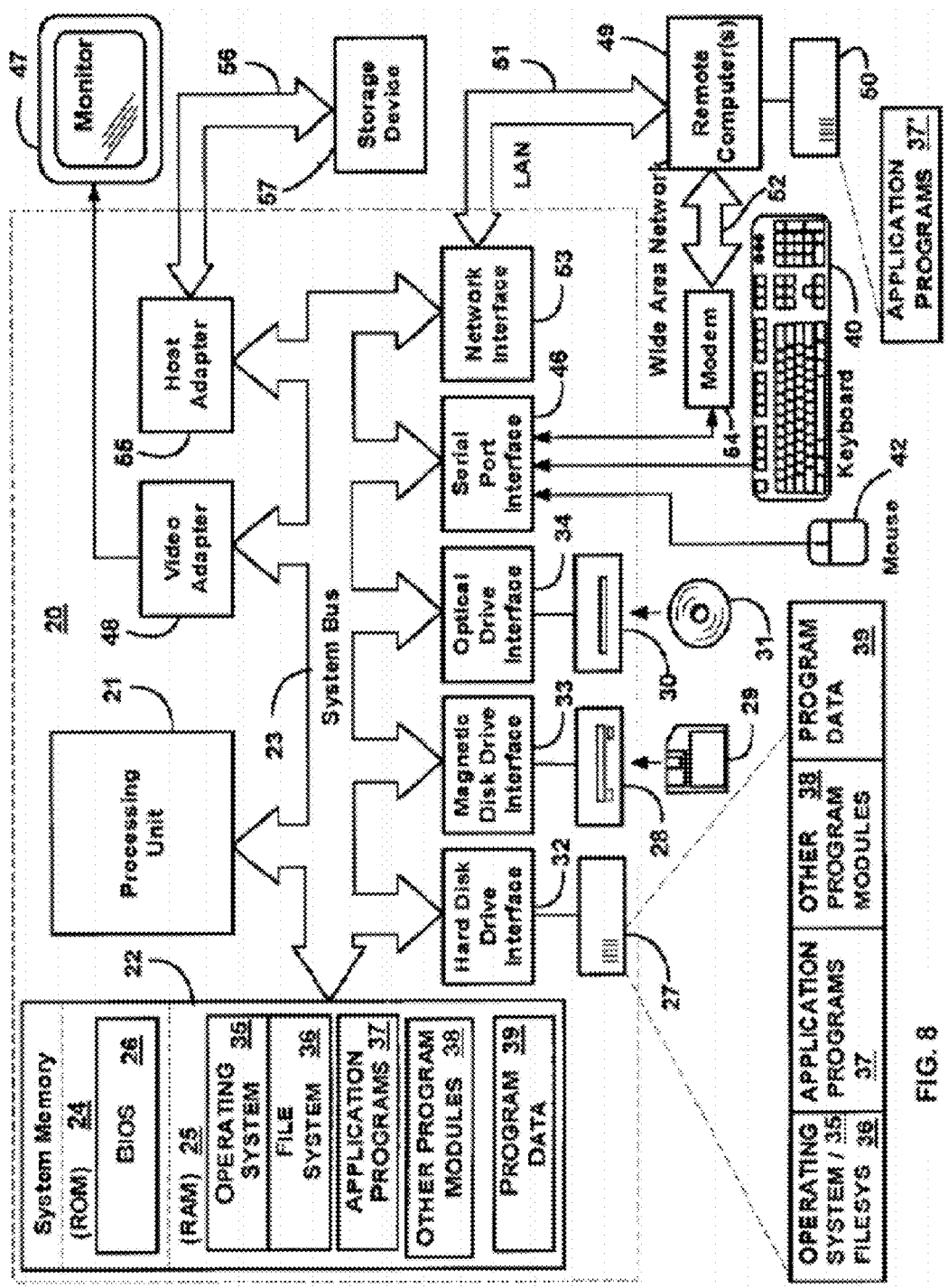
FIG. 8 illustrates an exemplary computer system on which the invention may be implemented.

With reference to FIG. 8, an exemplary system for implementing the invention includes a general purpose computing device in the form of a personal computer or server 20 or the like, including a processing unit 21, a system memory 22, and a system bus 23 that couples various system components including the system memory to the processing unit 21. The system bus 23 interfaces to the host adapter 55, which in turn communicates with the storage device 57 using a bus 56. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24.

The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (preferably WINDOWS 2000). The computer 20 includes a file system 36 associated with or included within the operating system 35, such as the WINDOWS NT File System (NTFS), one or more application programs 37, other program modules 38 and program data 39. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers 49. The remote computer (or computers) 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

What is claimed is:

1. A method for integration of non-native widgets into a host operating system (OS), comprising:
   creating a Virtual Machine (VM) running a guest OS on a computer system with the host OS;
   launching the VM on the computer system with a host desktop being displayed to a user;
   displaying an icon corresponding to the VM on the host desktop; and displaying a widget running on the guest OS on the host desktop upon a user clicking on the icon, the widget being an interactive tool that provides a single-purpose service, wherein a guest desktop of the guest OS and any non-native application window is masked out, except for the widget portion, so that the widget is virtualized and presented to a user as a native widget that is seamlessly integrated into the host OS.

2. The method of claim 1, wherein a plurality of widgets is displayed on the host desktop.

3. The method of claim 1, wherein the widget is a web applet downloaded into the VM.

4. The method of claim 1, wherein a plurality of VMs are installed and launched on the computer system and wherein each VM is running at least one widget on its guest OS.

5. The method of claim 1, wherein the widget is displayed on the host desktop upon launching the VM.

6. The method of claim 1, wherein an icon corresponding to the widget is added to any of a Taskbar, Dashboard, Sidebar, Menu Bar, Quick Launch area and Dock Bar of the host desktop.

7. The method of claim 6, wherein the widget is displayed on the host desktop upon the user clicking on the icon.

8. The method of claim 1, wherein the widget is displayed with a skin selected by the user in an irregular-shaped window.

9. The method of claim 1, wherein the widget receives information for display to a user from a local non-native application.

10. The method of claim 1, wherein the widget receives information for display to a user from an application that runs on a remote computer and that interfaces to non-native client-side code.

11. The method of claim 1, wherein the widget is displayed in a non-rectangular window.

12. The method of claim 1, wherein all widgets appear on a screen when the VM is activated.

13. The method of claim 1, wherein the widget is activated by clicking on a corresponding icon on the host desktop.

14. The method of claim 1, wherein clicking on the corresponding icon activates the VM.

15. The method of claim 1, further comprising displaying multiple non-native widgets on the host desktop, wherein a single icon on the host desktop designates all non-native widgets from a particular VM.

16. The method of claim 1, further comprising displaying multiple non-native widgets on the host desktop, wherein a single icon on the host desktop designates all non-native widgets, including non-native widgets from multiple VMs.

17. A non-transitory computer useable recording medium having computer executable program logic stored thereon for executing on a processor, the computer executable program logic including code for implementing the steps of:

creating a Virtual Machine (VM) running a guest OS on a computer system with the host OS;

launching the VM on the computer system with a host desktop being displayed to a user;

displaying an icon corresponding to the VM on the host desktop; and displaying a widget running on the guest OS on the host desktop upon a user clicking on the icon, the widget being an interactive tool that provides a single-purpose service, wherein a guest desktop of the guest OS and any non-native application window is masked out, except for the widget portion, so that the widget is virtualized and presented to a user as a native widget that is seamlessly integrated into the host OS.

18. A system for integration of non-native widgets into a host operating system (OS), the system including a processor and a memory coupled to the processor, and computer code executing on the processor and loaded into the memory, the computer code executing the steps of:

creating a Virtual Machine (VM) running a guest OS on a computer system with the host OS;

launching the VM on the computer system with a host desktop being displayed to a user;

displaying an icon corresponding to the VM on the host desktop; and displaying a widget running on the guest OS on the host desktop upon a user clicking on the icon, the widget being an interactive tool that provides a single-purpose service, wherein a guest desktop of the guest OS and any non-native application window is masked out, except for the widget portion, so that the widget is virtualized and presented to a user as a native widget that is seamlessly integrated into the host OS.

19. A method for integration of non-native widgets into a host operating system (OS), the method comprising:

starting a Virtual Machine (VM) on a computer system with the host OS, the VM having a Virtual Machine Monitor (VMM) and a Hypervisor;

running a guest API and a conversion API on the VM;

launching the VM on the computer system with a host desktop being displayed to a user, the host desktop displaying a dashboard with objects supported by the host API running on the host OS;

displaying a list of widgets supported by the guest API, the widgets being interactive tools that provide a single-purpose service;

selecting, in response to a user command, the widgets to be virtualized and added to the dashboard;

converting, by the conversion API, the selected widgets and adding them to the host desktop, wherein any non-selected widgets are masked out; and displaying the selected widgets to a user as native dashboard objects that are seamlessly integrated into the host OS.

* * * * *